US012637889B2

(12) United States Patent
Lacy et al.

(10) Patent No.: US 12,637,889 B2
(45) **Date of Patent: *May 26, 2026**

(54) HOLD-OPEN DEVICE FOR DOOR CLOSERS

(71) Applicant: Schlage Lock Company LLC, Carmel, IN (US)

(72) Inventors: Yong K. Lacy, Carmel, IN (US); Akhil Ramesh Hamsagar, Bangalore (IN); Adithya Gangadhar Shetty, Bangalore (IN); Vijayakumar Mani, Bangalore (IN); Sundar Raj Dore Vasudevan, Bangalore (IN); David V. Toloday, Martinsville, IN (US); Kanagaraj Shanmugam, Tamilnadu (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,950

(22) Filed: Aug. 27, 2024

(65) Prior Publication Data

US 2025/0198211 A1 Jun. 19, 2025

Related U.S. Application Data

(63) Continuation of application No. 18/075,966, filed on Dec. 6, 2022, now Pat. No. 12,071,806, which is a (Continued)

(51) Int. Cl.

| | |
|---|---|
| ***E05F 3/00*** | (2006.01) |
| ***E05F 1/10*** | (2006.01) |
| ***E05F 3/22*** | (2006.01) |

(52) U.S. Cl.

CPC ................ *E05F 3/221* (2013.01); *E05F 1/10* (2013.01); *E05Y 2201/41* (2013.01);

(Continued)

(58) Field of Classification Search

CPC .......... E05C 17/02; E05C 17/54; E05C 17/34; E05C 17/32; E05F 3/221; E05F 1/10;

(Continued)

(56) References Cited

U.S. PATENT DOCUMENTS

| | | | |
|---|---|---|---|
| 1,003,652 A | 9/1911 | Regan | |
| 1,508,466 A | 9/1924 | Joseph | |

(Continued)

FOREIGN PATENT DOCUMENTS

| | | | |
|---|---|---|---|
| GB | 2205899 A * | 12/1988 | E05F 3/223 |
| GB | 2507582 A | 5/2014 | |

(Continued)

OTHER PUBLICATIONS

International Search Report; International Searching Authority; International Application No. PCT/US2022/017662; Jun. 9, 2022; 2 pages.

(Continued)

*Primary Examiner* — Chuck Y Mah

(74) *Attorney, Agent, or Firm* — Taft Stettinius & Hollister LLP

(57) ABSTRACT

An exemplary modular hold-open device is configured for use with a door closer comprising a body, a pinion rotatably mounted to the body, and an armature connected with the pinion. The modular hold-open device is configured to be mounted to the door closer, to selectively prevent rotation of the pinion by exerting on the pinion a resistive torque in a door-opening direction, and to cease exerting the resistive torque in response to a door-closing torque on the pinion exceeding a threshold torque to thereby permit rotation of the pinion in the door-closing direction.

20 Claims, 13 Drawing Sheets

Related U.S. Application Data continuation of application No. 17/184,040, filed on Feb. 24, 2021, now Pat. No. 11,519,212.

(52) U.S. Cl.
CPC ... *E05Y 2201/418* (2013.01); *E05Y 2201/716* (2013.01); *E05Y 2201/722* (2013.01); *E05Y 2900/132* (2013.01)

(58) Field of Classification Search
CPC ........... E05Y 2201/41; E05Y 2201/418; E05Y 2201/716; E05Y 2201/722; E05Y 2900/132; E05Y 16/49; E05Y 16/51; E05Y 16/62; E05Y 16/66; E05Y 16/64; E05Y 16/65; E05Y 16/71; E05Y 16/80
See application file for complete search history.

(56) References Cited

U.S. PATENT DOCUMENTS

| | | | |
|---|---|---|---|
| 2,012,731 | A | 8/1935 | Sasgen |
| 3,178,759 | A | 4/1965 | Patriquin et al. |
| 3,259,936 | A | 7/1966 | Sheridan |
| 3,260,545 | A | 7/1966 | Check |
| 3,877,108 | A | 4/1975 | Del Fiacco |
| 3,905,063 | A | 9/1975 | Coulter et al. |
| 3,909,877 | A | 10/1975 | Cristy et al. |
| 3,935,614 | A | 2/1976 | Pannone et al. |
| 4,491,355 | A | 1/1985 | Marinoni |
| 4,803,754 | A | 2/1989 | Roberts |
| 5,193,647 | A | 3/1993 | O'Brien, II |
| 5,243,735 | A | 9/1993 | O'Brien, II |
| 5,495,639 | A | 3/1996 | Wartian |
| 5,517,720 | A | 5/1996 | Anderson et al. |
| 5,525,963 | A | 6/1996 | Purssey |
| 5,551,740 | A | 9/1996 | Lin et al. |
| 6,006,475 | A | 12/1999 | Schwantes et al. |
| 6,108,975 | A | 8/2000 | Bailey |
| 6,634,057 | B2 | 10/2003 | Wartian |
| 6,786,006 | B2 | 9/2004 | Kowalczyk et al. |
| 6,891,479 | B1 | 5/2005 | Eccleston |
| 7,571,515 | B2 | 8/2009 | Fischbach et al. |
| 8,169,169 | B2 | 5/2012 | Hass et al. |
| 8,527,101 | B2 | 9/2013 | Burris et al. |
| 8,564,235 | B2 | 10/2013 | Burris et al. |
| 8,695,163 | B2 | 4/2014 | Roberts |
| 9,536,400 | B2 | 1/2017 | Asada |
| 9,869,117 | B2 | 1/2018 | Houser et al. |
| 9,995,076 | B1 | 6/2018 | Hoffberg |
| 10,030,426 | B2 | 7/2018 | Langenberg |
| 10,184,283 | B2 | 1/2019 | Yeh |
| 10,236,801 | B2 | 3/2019 | Dye et al. |
| 10,316,568 | B2 | 6/2019 | Langenberg et al. |
| 10,385,601 | B2 | 8/2019 | McKibben et al. |
| 10,648,208 | B2 | 5/2020 | Eickhoff |
| 2010/0199564 | A1 | 8/2010 | Plavnik et al. |
| 2012/0240474 | A1 | 9/2012 | Purssey |
| 2013/0091768 | A1 | 4/2013 | Houser et al. |
| 2017/0292311 | A1 | 10/2017 | Podkypayev |
| 2018/0334841 | A1 | 11/2018 | Langenberg et al. |
| 2019/0319557 | A1 | 10/2019 | Dye et al. |
| 2019/0383080 | A1 | 12/2019 | Barbon et al. |
| 2019/0390498 | A1 | 12/2019 | Worner |
| 2020/0190885 | A1 | 6/2020 | Coleman |

FOREIGN PATENT DOCUMENTS

| | | | |
|---|---|---|---|
| GB | 2561480 | A | 3/2021 |
| JP | 2003035065 | A | 9/2007 |
| WO | 2007057672 | A2 | 5/2007 |
| WO | 2010128314 | A2 | 11/2011 |
| WO | 2015180769 | A1 | 12/2015 |
| WO | 2017191449 | A1 | 11/2017 |

OTHER PUBLICATIONS

Written Opinion of the International Searching Authority; International Searching Authority; International Application No. PCT/US2022/017662; Jun. 9, 2022; 7 pages.

CA Examination Report; Canadian Intellectual Property Office; Canadian Patent Application No. 3,209,728; Jan. 15, 2025; 3 pages.

* cited by examiner

HOLD-OPEN DEVICE FOR DOOR CLOSERS

CROSS REFERENCE TO RELATED APPLICATIONS

The present application is a continuation of U.S. patent application Ser. No. 18/075,966 filed Dec. 6, 2022 and issued as U.S. Pat. No. 12,071,806, which is a continuation of U.S. patent application Ser. No. 17/184,040 filed Feb. 24, 2021 and issued as U.S. Pat. No. 11,519,212, the contents of each application are incorporated herein by reference in their entirety.

TECHNICAL FIELD

The present disclosure generally relates to door closers, and more particularly but not exclusively relates to modular add-ons for hydraulic door closers.

BACKGROUND

Hydraulic door closers are frequently installed to closure assemblies to assist in closing a door of the closure assembly. While certain door closers have additional functions, many existing door closers lack such additional functions, and serve primarily to aid in closing of the door. Recently, there has been a trend toward providing the end-user with additional functions, such as holding of the door in its open position. However, many existing solutions for providing such additional functionality require that the user replace the existing closer with a new closer having the additional function, a process that can be costly and time-consuming. While certain modular hold-open devices exist, these typically require an electronic signal to transition from the holding state to the release state. In certain circumstances, however, it may be desirable to release the door from its held position by merely applying a sufficient closing force to the door. For these reasons among others, there remains a need for further improvements in this technological field.

SUMMARY

An exemplary modular hold-open device is configured for use with a door closer comprising a body, a pinion rotatably mounted to the body, and an armature connected with the pinion. The modular hold-open device is configured to be mounted to the door closer, and to selectively prevent rotation of the pinion by exerting on the pinion a resistive torque in a door-opening direction, and to cease exerting the resistive torque in response to a door-closing torque on the pinion exceeding a threshold torque to thereby permit rotation of the pinion in the door-closing direction. Further embodiments, forms, features, and aspects of the present application shall become apparent from the description and figures provided herewith.

DETAILED DESCRIPTION OF ILLUSTRATIVE EMBODIMENTS

Figure 1:
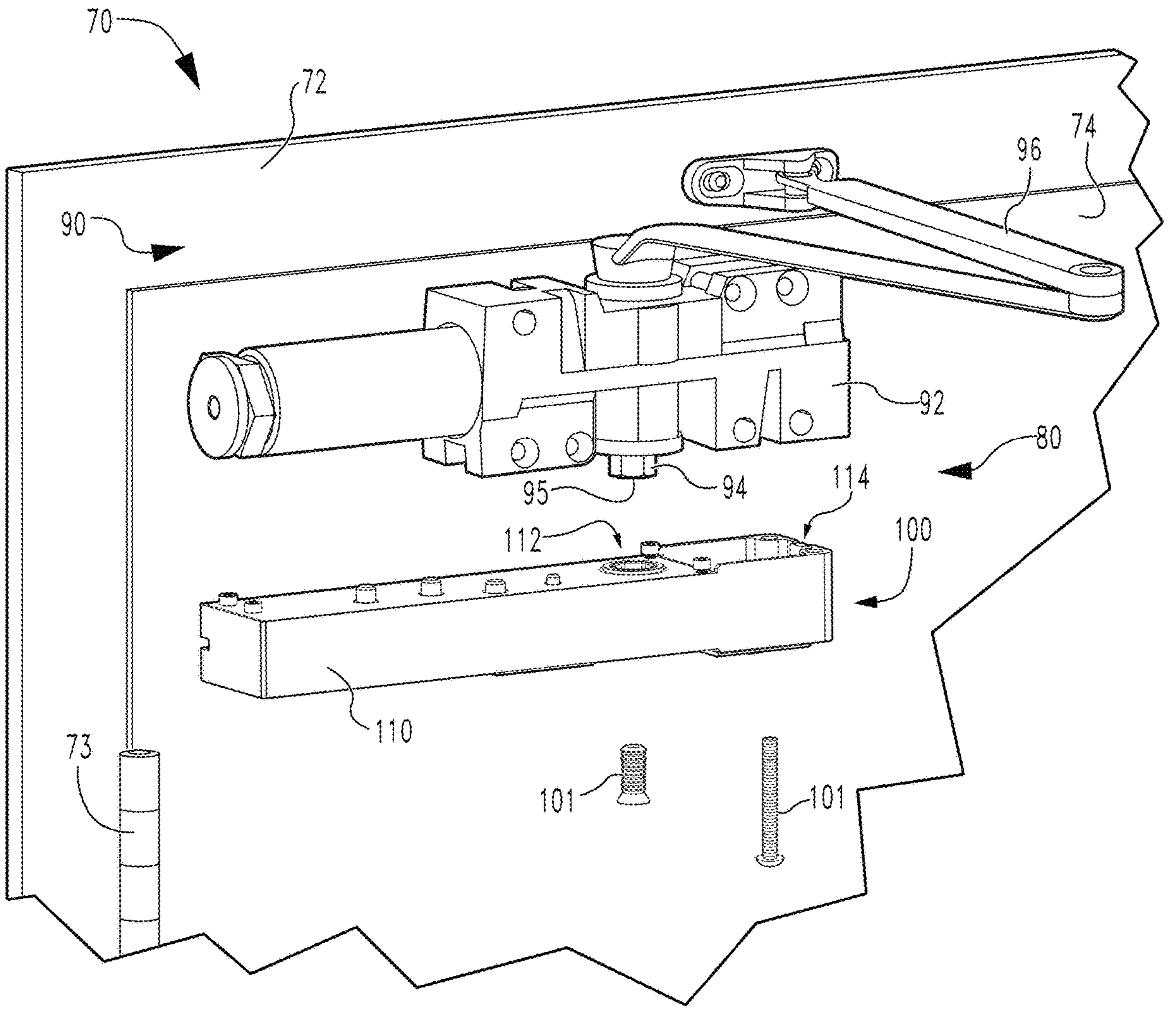
FIG. 1 is a perspective illustration of a closure assembly according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C);

(A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a closure assembly 70 according to certain embodiments. The closure assembly 70 generally includes a door frame 72 and a door 74 swingingly mounted to the frame 72, for example by one or more hinges 73. The closure assembly 70 further includes a door operator system 80 according to certain embodiments. The illustrated door operator system 80 generally includes a traditional door closer 90 and a modular hold-open device 100 according to certain embodiments. It is also contemplated that the door operator system 80 may include another form of modular hold-open device, such as the hold-open device 200 illustrated in FIGS. 8-18 or the assembly 300' illustrated in FIGS. 15-18.

The door closer 90 generally includes a body 92, a pinion 94 rotatably mounted to the body 92, and an armature 96 connected with the pinion 94. The body 92 is mounted to one of the frame 72 or the door 74, and the armature 96 is connected between the pinion 94 and the other of the frame 72 or the door 74. In the illustrated form, the body 92 is mounted to the door 74, and the armature 96 is connected between the pinion 94 and the frame 72. In other embodiments, the body 92 may be mounted to the frame 72, and the armature 96 may be connected between the pinion 94 and the door 74. One end portion of the pinion 94 projects upward from the upper side of the body 92 and is engaged with the armature 96, and an opposite end portion of the pinion 94 projects downward from the lower side of the body 92 and defines an exposed end portion 95 of the pinion 94.

While the illustrated door closer 90 is provided with a "standard" arrangement for the armature 96, in which the armature 96 extends away from the door 74 when the door 74 is in its closed position, it is also contemplated the that the closer 90 may be provided with a "parallel arm" arrangement, in which the armature 96 extends substantially parallel to the door 74 when the door 74 is in its closed position. Moreover, the illustrated armature 96 is provided as a pivoting armature, in which a first arm is coupled with the pinion 94, a second arm is pivotably connected with the frame 72, and the first and second arms are connected at a pivot joint. In other embodiments, the armature 96 may be provided as a rigid armature in which one end is coupled with the pinion 94 and the other end is slidably mounted in a track. As such, the illustrated embodiment of the door closer 90 should not be construed as limiting.

During operation of the door closer 90, opening of the door 74 is correlated with rotation of the pinion 94 in a door-opening direction, and closing of the door 74 is correlated with rotation of the pinion 94 in a door-closing direction opposite the door-opening direction. Additionally, the closer 90 is configured to generate a biasing force urging the pinion 94 in the door-closing direction such that the closer 90 urges the door 74 toward its closed position. For example, the closer 90 may include a rack gear engaged with the pinion 94 and a spring engaged with the rack gear. In such forms, opening of the door 74 drives the pinion 94 in the door-opening direction, thereby shifting the rack gear in a first direction and compressing the spring. During closing of the door 74, the spring expands, thereby driving the rack gear in a second direction opposite the first direction and urging the pinion 94 in the door-closing direction, thereby urging the door 74 toward its closed position. The closer 90 may further include one or more hydraulic passages through which a hydraulic fluid flows to modulate the opening and/or closing speed of the door 74. Door closers of this type are known in the art, and need not be described in further detail herein. Moreover, while a hydraulic door closer has been described, it is to be appreciated that the closer 90 may include electromechanical features in addition or as an alternative to hydraulic features.

Figure 2:
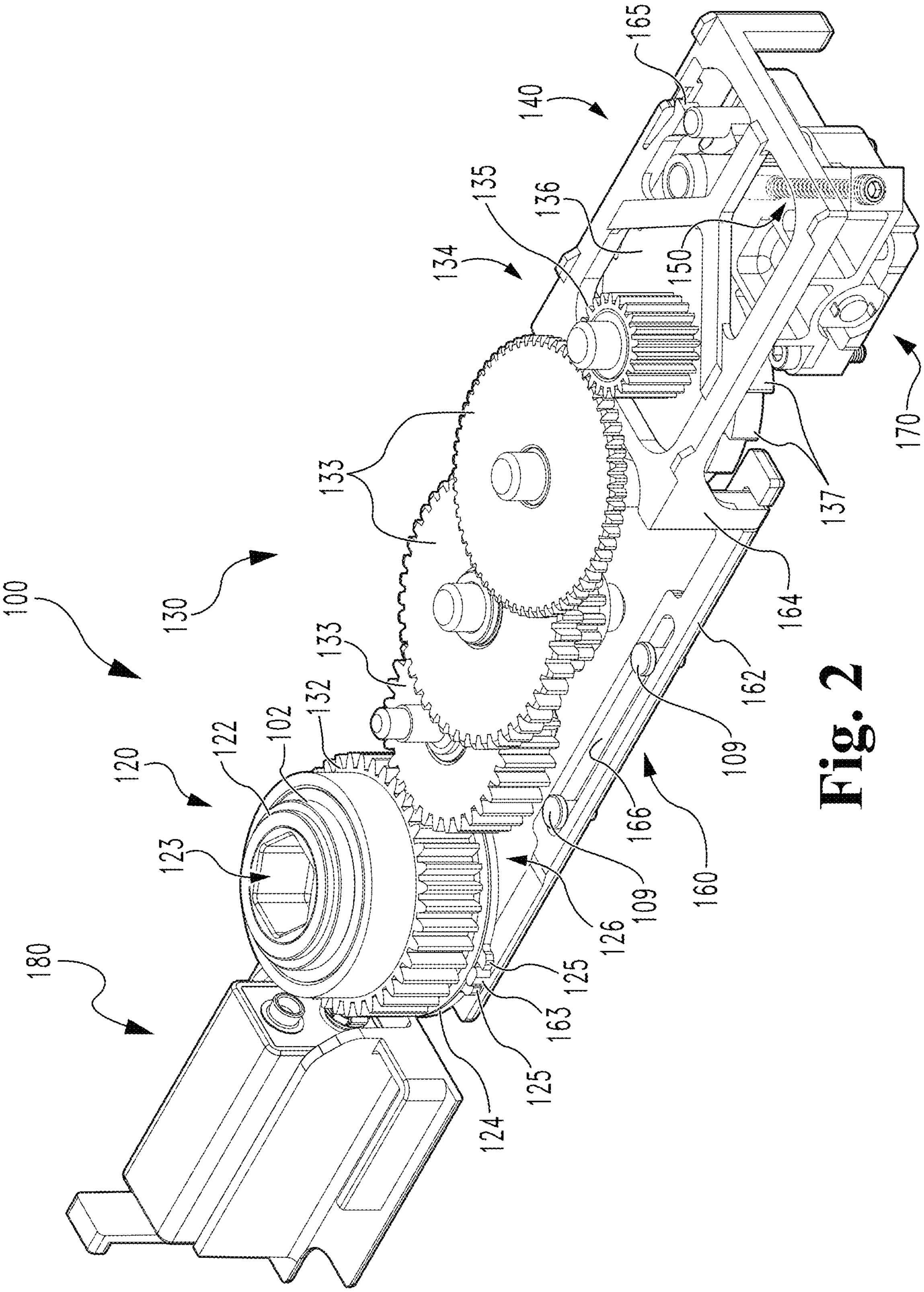
FIG. 2 is a perspective illustration of a modular hold-open device according to certain embodiments.
Figure 3:
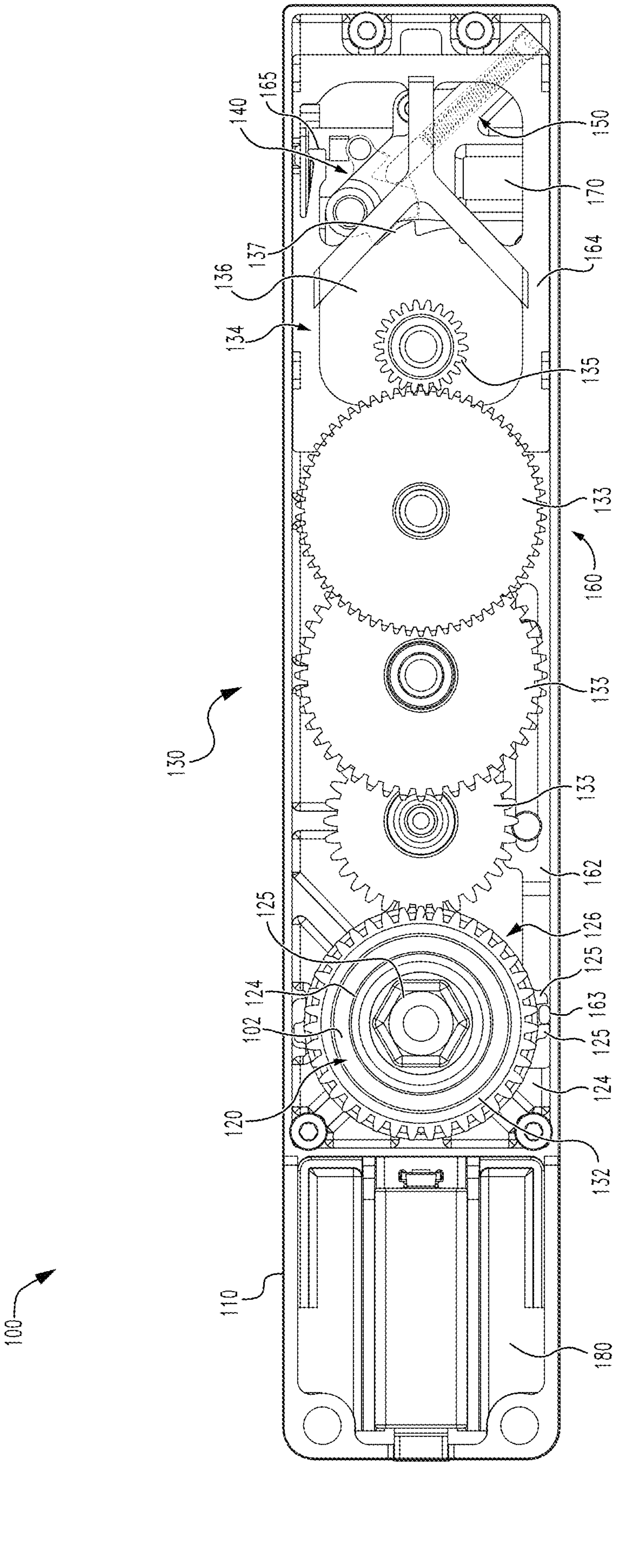
FIG. 3 is a plan view of the modular hold-open device illustrated in FIG. 2.

With additional reference to FIGS. 2 and 3, the illustrated modular hold-open device 100 generally includes a case 110, a pinion-engaging shaft 120 rotatably mounted in the case 110, a reduction gear set 130 operably coupled with the pinion-engaging shaft 120 via a one-way bearing 102, a pawl 140 configured to selectively inhibit rotation of the reduction gear set 130, a bias mechanism 150 configured to selectively inhibit movement of the pawl 140 from a holding position to a release position, and a reset mechanism 160 operable to selectively move the pawl 140 from the release position to the holding position. The hold-open device 100 may further include a driver 170 operable to selectively move the pawl 140 from the holding position to the release positon, and a control assembly 180 operable to control operation of the driver 170. As described herein, the hold-open device 100 is configured to selectively retain the door 74 in an open position, and to permit the door 74 to return to the closed position in response to a threshold closing torque being applied to the door 74, and may further be configured to permit the door 74 to return to the closed position in response to a door close signal.

The case 110 houses the internal components of the hold-open device 100 and facilitates installation of the device 100 to the closer 90 as a modular unit. The case 110 includes an aperture 112 through which the pinion shaft 120 is operable to engage the exposed end portion 95 of the pinion 94, and may further include one or more mounting apertures 114 operable to receive bolts 101 by which the modular hold-open device 100 can be mounted to the body 92 of the closer 90.

The pinion-engaging shaft 120 is rotatably mounted in the case 110, and includes a head 122 aligned with the aperture 112, a plate 124 opposite the head 122, and a body portion extending between the head 122 and the plate 124. The head 122 includes a recess 123 sized and shaped to receive the exposed end portion 95 of the pinion 94. More particularly, the recess 123 is sized and shaped for rotational coupling with the exposed end portion 95. In the illustrated form, the exposed end portion 95 has a generally hexagonal geometry, and the recess 123 has a corresponding hexagonal geometry. It is also contemplated that other geometries and configurations may be utilized. For example, should the exposed end portion 95 include one of a projection or a recess having a particular geometry (e.g., a polygonal geometry), the pinion-engaging shaft 120 may include the other of a projection or a recess having a mating geometry such that the mated recess and projection are operable to transfer torque between the pinion 94 and the shaft 120. The plate 124 is positioned opposite the head 122, and includes an engagement feature 125 (e.g., a pair of projections) operable to engage the reset mechanism 160 as described in further detail below. As described herein, the plate 124 may be connected with the body of the pinion-engaging shaft 120 via an overrunning clutch 126. The clutch 126 may, for example, be provided as a friction clutch, a magnetic clutch, or another form of clutch.

The reduction gear set 130 includes a first gear 132 engaged with the pinion-engaging shaft 120 via the one-way bearing 102, and a ratchet gear 134 engaged with the first gear 132, for example via one or more intermediate gears 133. The ratchet gear 134 generally includes a gear portion 135 engaged with the first gear 132 (e.g., via the one or more intermediate gears 133) such that rotation of the first gear 132 and rotation of the ratchet gear 134 are correlated with one another. The ratchet gear 134 further includes a ratchet wheel 136 including a plurality of ratchet teeth 137 operable to engage the pawl 140. The reduction gear set 130 is configured to convert the higher torque, lower speed rotation of the pinion-engaging shaft 120 to a lower torque, higher speed rotation of the ratchet gear 134. Conversely, the reduction gear set 130 will also convert a lower torque exerted on the ratchet wheel 136 by the pawl 140 to a higher torque on the first gear 132. While the illustrated reduction gear set 130 has a gear ratio of about 16:1, those skilled in the art will readily appreciate that other gear ratios may be selected as appropriate.

As noted above, the first gear 132 of the reduction gear set 130 is engaged with the pinion-engaging shaft 120 via the one-way bearing 102. The one-way bearing 102 is configured to transmit a rotation of the pinion-engaging shaft 120 in a first rotational direction to the first gear 132, and to permit the pinion-engaging shaft 120 to rotate relative to the first gear 132 in a second rotational direction opposite the first rotational direction. More particularly, the one-way bearing 102 is configured to transmit rotation of the pinion-engaging shaft 120 in the door-closing direction, and to permit the pinion-engaging shaft 120 to rotate relative to the first gear 132 when the pinion-engaging shaft 120 is rotated in the door-opening direction. As such, a door-closing torque (i.e., a torque in the door-closing direction) exerted on the pinion-engaging shaft 120 (e.g., by the pinion 94) causes a corresponding resultant torque to be exerted on the ratchet gear 134, while a door-opening torque (i.e., a torque in the door-opening direction) exerted on the pinion-engaging shaft 120 will not be transmitted to the reduction gear set 130. Conversely, a resistive torque in the door-opening direction exerted on the gear set 130 (e.g., by the pawl 140) will be transmitted to the pinion-engaging shaft 120 by the one-way bearing 102.

Figure 4:
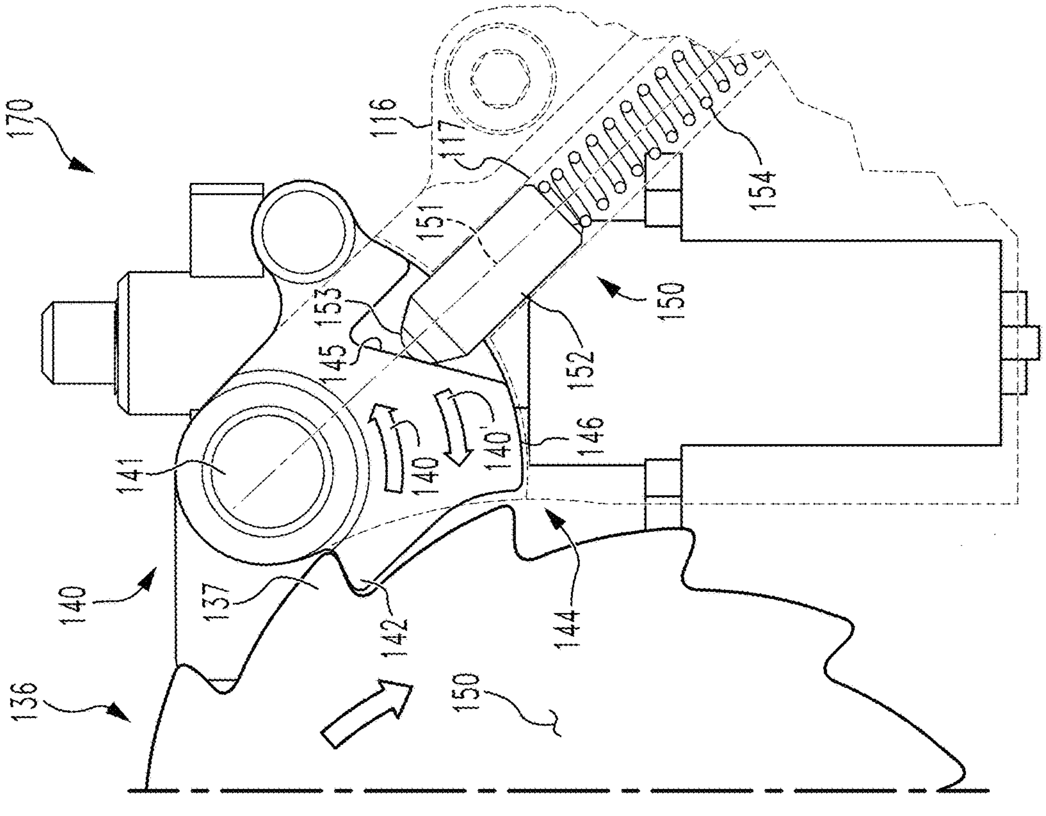
FIG. 4 is a plan view of a portion of the modular hold-open device, and illustrates a pawl in a holding position.
Figure 5:
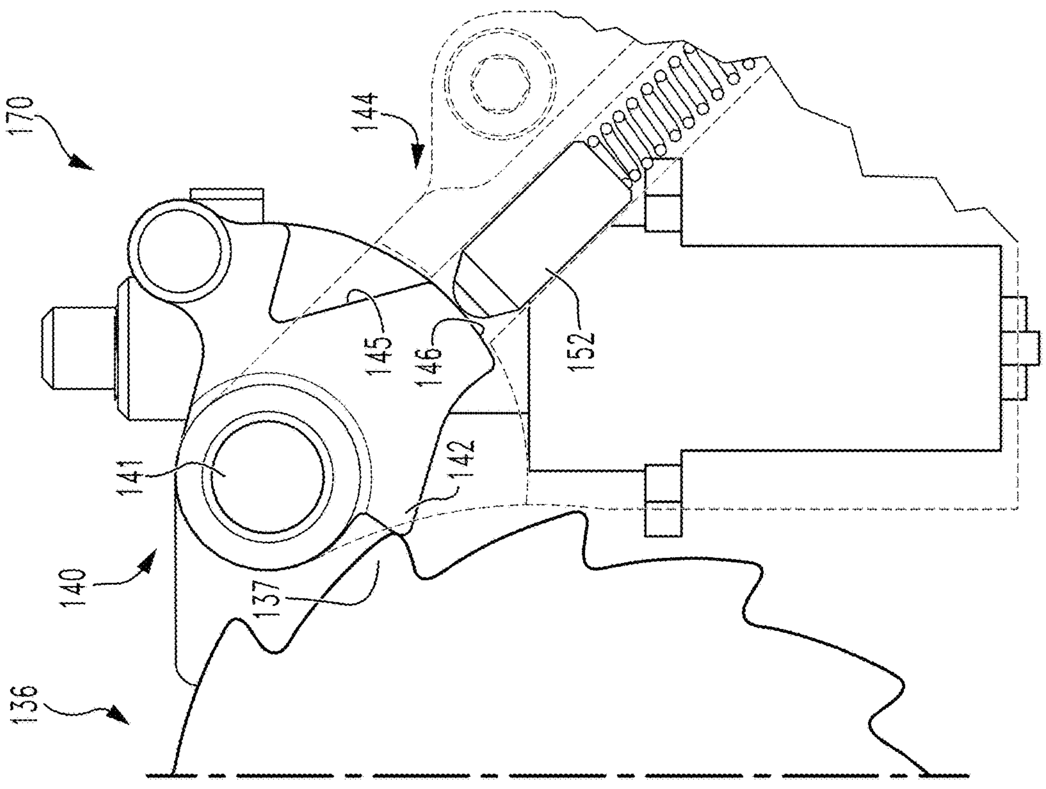
FIG. 5 is a plan view of a portion of the modular hold-open device, and illustrates the pawl in a release position.

With additional reference to FIGS. 4 and 5, the pawl 140 is mounted in the case 110 for movement between a holding position (FIG. 4) defining a holding state of the hold-open device 100 and a release position (FIG. 5) defining a releasing state of the hold-open device 100. While the illustrated pawl 140 is mounted for pivotal movement about a pivot pin 141, it is also contemplated that the pawl 140 may be mounted for translational movement between the holding position and the release position. The pawl 140 generally includes a tooth 142 operable to engage the ratchet wheel 136, and a cam surface 144 operable to engage the bias mechanism 150. The cam surface 144 generally includes a ramp 145 and a landing 146 adjacent the ramp 145, the functions of which are described in further detail below. The pawl 140 may further include an armature 148 (FIG. 6) by which the pawl 140 is operable to engage the reset mechanism 160 and/or the driver 170.

The bias mechanism 150 is mounted in the case 110, and includes a pin 152 having a tapered nose that is engaged with the cam surface 144 of the pawl 140, and a bias element in the form of a spring 154 biasing the pin 152 into engagement with the pawl 140. In the illustrated form, the case 110 includes a support bracket 116 that defines a bore 117, and the bias mechanism 150 is mounted in the bore 117 such that the bore 117 limits the pin 152 to movement along an axis 151 that intersects the pivot pin 141. As a result of this intersection and the configuration of the landing 146, the bias mechanism 150 exerts little to no biasing torque on the pawl 140 when the pawl 140 is in the release position. In the illustrated form, the pin 152 is biased into engagement with the cam surface 144 by a compression spring 154. It is also contemplated that the bias mechanism 150 may include additional or alternative biasing elements, such as a torsion spring, a leaf spring, an elastic member, and/or magnets. The bias mechanism 150 may further include an adjustment member such as a set screw 156 (FIG. 6) that is engaged with the end of the spring 154 opposite the end that is engaged with the pin 152. The set screw 156 may be threadedly engaged with the bore 117 such that rotation of the set screw 156 in opposite directions advances and retracts the set screw 156, thereby adjusting the preloading of the spring 154.

The reset mechanism 160 is slidably mounted in the case 110, and generally includes a slide plate 162 and a bracket 164 engaged with the slide plate 162. The slide plate 162 includes a second engagement feature, such as at least one projection 163, which is operable to be engaged by the first engagement feature 125 of the spindle-engaging shaft 120 as described herein. In the illustrated form, the bracket 164 is engaged with the slide plate 162 for joint sliding movement therewith, and includes an arm 165 operable to engage the armature 148 of the pawl 140 to drive the pawl 140 from the holding position to the release position. It is also contemplated that the reset mechanism 160 may be operable to engage the pawl 140 in another manner. For example, the reset mechanism 160 may engage the pawl 140 via a gear arrangement such as that illustrated in association with the hold-open device 200 illustrated in FIGS. 9-14.

Figure 6:
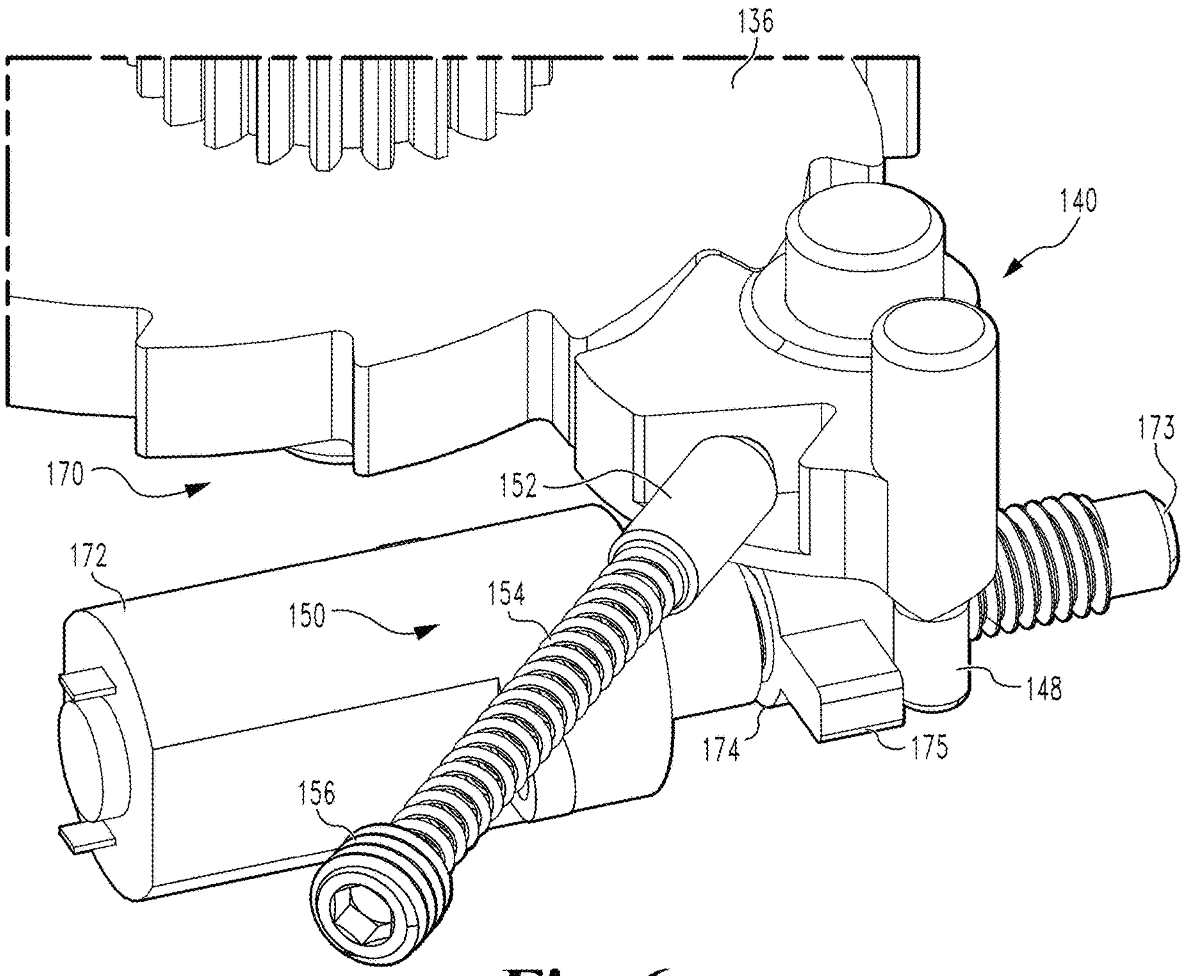
FIG. 6 is a perspective view of a portion of the modular hold-open device.

With additional reference to FIG. 6, the illustrated driver 170 is provided in the form of a linear actuator, and generally includes a rotary motor 172 having a threaded output shaft 173, and a threaded nut 174 rotatably mounted on the threaded output shaft 173. The nut 174 includes a projection 175 operable to engage the armature 148 of the pawl 140. The nut 174 is locked against rotation (e.g., via engagement with the case 110) such that rotation of the threaded output shaft 173 in a first rotational direction advances the nut 174 and rotation of the shaft 173 in a second rotational direction opposite the first rotational direction retracts the nut 174. In FIG. 6, the pawl 140 is illustrated in its holding position. In this state, the projection 175 is positioned on one side of the armature 148 such that advancement of the nut 174 causes the projection 175 to engage the armature 148 and drive the pawl 140 toward its release position. The pawl 140 is also operable to move to its release position upon application of a sufficient door-closing torque to the ratchet wheel 136 as described herein. While the illustrated driver 170 is provided as a motor-based linear actuator, it is also contemplated that the driver 170 may be provided as another form of electronic actuator operable to drive the pawl 140 from its holding position to its release position. By way of example, the driver 170 may include a solenoid and/or an electromagnet.

Figure 7:
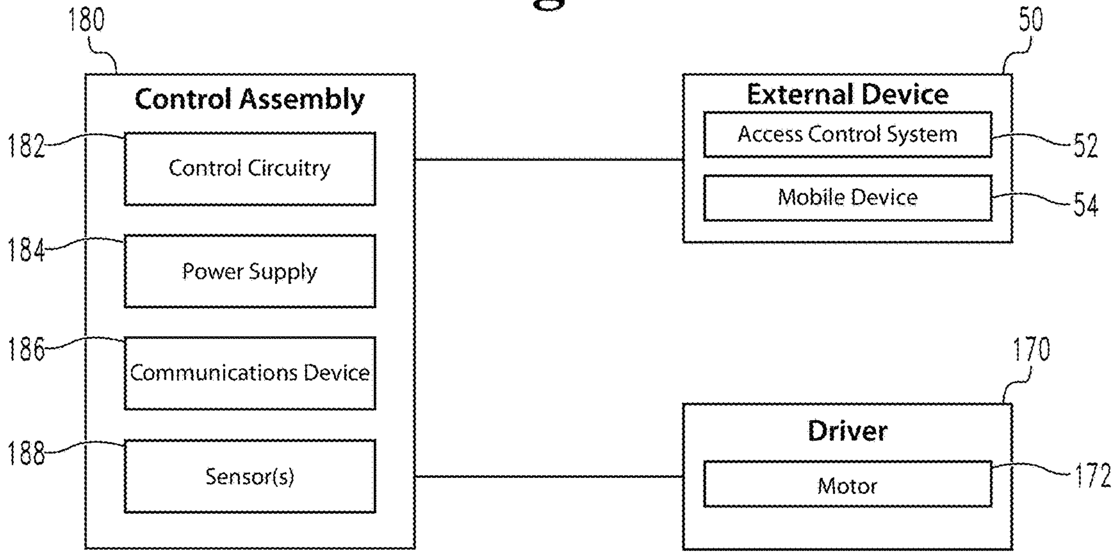
FIG. 7 is a schematic block diagram of the modular hold-open device.

With additional reference to FIG. 7, the illustrated control assembly 180 includes control circuitry 182 operable to control the driver 170, and may further include an onboard power source 184, a communications device 186, and/or one or more sensors 188. As described herein, the control circuitry 182 is configured to actuate the driver 170 to move the pawl 140 to the release position in response to a door close signal, which may be received via the communication device 186. In certain embodiments, the control circuitry 182 may include a processing device and may, for example, take the form of the computing device 600 illustrated in FIG. 21. It is also contemplated that the control circuitry 182 may not necessarily include a processing device.

In the illustrated form, the control assembly 180 includes an onboard power source 184 such as a battery and/or a supercapacitor. Additionally or alternatively, the control assembly 180 may be configured for connection to line power. When present, the communications device 186 facilitates communication between the control assembly 180 and an external device 50, such as an access control system 52, and may be provided as a wired or wireless communications device. In certain embodiments, the control assembly 180 may include one or more sensors 188 that facilitate operation of the hold-open device 100. The sensor(s) 188 may include a door position sensor that detects the position of the door 74, for example by detecting the rotational position of the pinion-engaging shaft 120.

During operation of the closure assembly 70, the door 74 may begin in a closed position, and the pawl 140 may begin in its holding position. A user may open the door 74 by exerting an opening force on the door (e.g., by pushing the push side of the door 74 or pulling a handle coupled to the pull side of the door 74). Such opening of the door 74 is partially resisted by the door closer 90 as described above, but is not significantly resisted by the hold-open device 100. More particularly, the one-way bearing 102 does not transmit the door-opening rotation of the pinion 94 to the gear train 130. As a result, the user may not necessarily perceive any difference in the opening function of the door 74.

When the user releases the door 74 while the door 74 is open, the door 74 may begin to close as the internal components of the closer 90 (e.g., a spring and rack) exert a door-closing torque on the pinion 94. This door-closing torque on the pinion 94 is transmitted to the pinion-engaging shaft 120, which in turn exerts a door-closing torque on the first gear 132 via the one-way bearing 102. As a result, a corresponding door-closing torque $\tau_{136}$ is exerted on the ratchet wheel 136 by the gear set 130, thereby causing the ratchet tooth 137 to engage the pawl tooth 142 and urge the pawl 140 toward its release position with a pawl torque $\tau_{140}$. However, this torque $\tau_{140}$ on the pawl 140 is countered by the bias mechanism 150 as described herein, thereby selectively locking the gear train 130 and the pinion-engaging shaft 120 against rotation in the door-closing direction.

As noted above, when the pawl 140 is in its holding position (FIG. 4), the pin 152 is urged into engagement with the ramp 145 by the spring 154. The ramp 145 is arranged such that the biasing force exerted by the spring 154 on the pin 152 is translated to a resistive torque $\tau_{140}'$ on the pawl 140. As will be appreciated, the resistive torque $\tau_{140}'$ results in a corresponding resistive torque being applied to the pinion-engaging shaft 120 via the reduction gear set 130 such that the resistive torque exerted on the pinion 94 is greater than the resistive torque $\tau_{140}'$ applied to the pawl 140. Moreover, the resistive torque $\tau_{140}'$ applied to the pawl 140 (and thus the resistive torque exerted on the pinion 94) corresponds to the force exerted by the spring 154, which may be adjustable via the set screw 156 as described above.

The resistive torque $\tau_{140}'$ may be selected such that the hold-open device 100 is operable to hold the door 74 in the last position to which it was opened by overcoming the biasing force exerted by the door closer 90. As a result, the door 74 remains in the last position to which it was opened by the user for so long as the pawl 140 remains in its holding position. Thus, in addition to being capable of holding the door 74 in its fully open position, the illustrated hold-open device is also capable of holding the door 74 at incremental angles along the swing path of the door 74. This feature may be of particular use to those who find it difficult to open the door fully, such as those using walkers or wheelchairs and those with weak balance.

In order to move the pawl 140 to its release position (and thus transition the hold-open device 100 to its releasing state to thereby permit closing of the door 74 under the biasing force of the closer 90), the user may exert a closing torque on the door 74 (e.g., by pushing the pull side of the door 74 or pulling a handle located on the push side of the door 74). This user-exerted closing torque supplements the closing torque provided by the closer 90, thereby increasing the door-closing torque $\tau_{136}$ on the ratchet wheel 136 and the corresponding torque $\tau_{140}$ on the pawl 140. When the total torque $\tau_{140}$ on the pawl 140 exceeds a threshold value (e.g., a value corresponding to the resistive torque $\tau_{140}'$ the bias mechanism 150 exerts on the pawl 140), the pawl 140 moves to its release position.

In the illustrated form, the pawl 140 is mounted for pivotal movement between its holding position and its release position, and the reduction gear set 130 is configured to rotate a ratchet mechanism in the form of the ratchet wheel 136 in response to rotation of the pinion-engaging shaft 120 in the door-closing direction. It is also contemplated that the pawl 140 and/or the ratchet mechanism may be mounted for another type of movement, such as linear movement. As one example, the pawl 140 may be mounted for sliding movement between its holding position and its release position. Additionally or alternatively, the ratchet mechanism may be provided in the form of a linear ratchet mechanism. Such a linear ratchet mechanism may, for example, be engaged with the gear set 130 via a rack and pinion assembly such that rotation of the pinion-engaging shaft 120 drives the linear ratchet mechanism in a first ratchet mechanism direction for engagement with the pawl 140 in a manner analogous to that described with reference to the engagement of the ratchet wheel 136 with the pawl 140.

With the pawl 140 in its release position (FIG. 5), the teeth 137 of the ratchet wheel 136 are able to clear the tooth 142 of the pawl 140 such that rotation of the ratchet wheel 136 is no longer inhibited. As a result, the gear set 130 is able to rotate in the door-closing direction, which in turn permits rotation of the pinion-engaging shaft 120 and the pinion 94 in the door-closing direction, thereby permitting the door 74 to close under the biasing force exerted by the closer 90. Those skilled in the art will readily appreciate that should the pawl 140 return to its holding position (e.g., under the urging of the bias mechanism 150), the pawl 140 would once again inhibit closing of the door 74. However, when the pawl 140 is in its release position, the bias mechanism 150 exerts little to no biasing torque on the pawl 140 due to the configuration of the landing 146 and the angle at which the axis 151 of force exertion extends relative to the pawl 140. While other forms are contemplated, in the illustrated embodiment, the landing 146 defines a circular arc segment about the pivot axis of the pawl 140, and the force axis 151 intersects the pivot pin 141 about which the pawl 140 pivots. As a result, the bias mechanism 150 exerts little to no biasing torque on the pawl 140 when the pawl 140 is in the release position.

While the bias mechanism 150 exerts little to no biasing torque on the pawl 140 when the pawl 140 is in its release position, those skilled in the art will readily appreciate that the bias mechanism 150 may exert a holding torque resisting rotation of the pawl 140 from its release position. This holding torque is the result of the frictional forces generated between the landing 146 and the nose of the pin 152, and is generally proportional to the force generated by the spring 154 when the pawl 140 is in its release position. This holding torque aids in discouraging the pawl 140 from returning to its holding position, for example due to vibrations and/or inertial forces that may occur during closing of the door 74.

When the pawl 140 is in its release position, the door 74 is free to return to its closed position under the biasing force provided by the door closer 90. When the door 74 reaches its closed position, the pawl 140 is returned to its holding position by the reset mechanism 160. More particularly, as the pinion-engaging shaft 120 returns to its door closed position (i.e., the rotational position correlated with the door 74 being in its closed position), the first engagement feature 125 of the pinion-engaging shaft 120 engages the second engagement feature 163 of the slide plate 162, thereby driving the slide plate 162 and the bracket 164 in a first direction (to the right in FIG. 3) from a home position toward a reset position. As the bracket 164 slides in the first direction, the arm 165 of the bracket 164 engages the armature 148 of the pawl 140, thereby pivoting the pawl 140 toward its holding position. As the pin 152 comes into engagement with the ramp 145, the bias mechanism 150 exerts a torque on the pawl 140, thereby completing movement of the pawl 140 to its holding position.

When the reset mechanism 160 reaches the reset position, continued movement of the reset mechanism 160 in the first direction is halted (e.g., by engagement of a bolt 109 with one end of a guide slot 166 formed in the slide plate 162). At this stage, continued rotation of the plate portion 124 is arrested, but the shaft 120 is capable of continued rotation due to the presence of the clutch 126. As such, the engagement features 125, 163 may remain engaged with one another. When the pinion-engaging shaft 120 is subsequently rotated in the door-opening direction, the engagement features 125, 163 cooperate to return the reset mechanism 160 to its home position by driving the reset mechanism 160 in a second direction opposite the first direction. When the reset mechanism 160 reaches its home position, continued movement of the reset mechanism 160 in the second direction is likewise halted (e.g., by engagement of a bolt 109 with an opposite end of the guide slot 166). At this stage, continued rotation of the plate portion 124 is arrested, but the pinion-engaging shaft 120 is capable of continued rotation due to the presence of the clutch 126. As such, the engagement features 125, 163 may remain engaged with one another.

As should be evident from the foregoing, the modular hold-open device 100 is configured to selectively prevent rotation of the pinion 94 by exerting on the pinion 94 a resistive torque in the door-opening direction of the pinion 94, and to cease exerting the resistive torque in response to a door-closing torque on the pinion exceeding a threshold torque to thereby permit rotation of the pinion 94 in the door-closing direction. Thus, when a user opens the door 74 to an arbitrary open position, the door closer assembly 80 will retain the door 74 in that position until a user exerts a sufficient torque on the door 74 to overcome the threshold torque value (or until a door close signal is received as described herein), at which point the door closer assembly 80 will return the door 74 to its closed position under the biasing force provided by the door closer 90.

As noted above, the hold-open device 100 is configured to move from its holding state to its releasing state when a user mechanically exerts a closing torque or closing force on the door 74 sufficient to overcome the threshold torque value. In the illustrated form, the hold-open device 100 is further configured to move from its holding state to its releasing state in response to a door close signal, which may, for example, be transmitted by an external device 50 such as an access control system 52 or a mobile device 54.

Upon receiving the door close signal (e.g., via the communications device 186), the control assembly 180 controls the driver 170 to move the pawl 140 to its release position. More particularly, the control assembly 180 provides the driver 170 with an actuating electrical power (e.g., from the onboard power supply 184 and/or an external power supply). For example, should the motor 172 be provided in the form of a stepper motor, the actuating power may be a first series of electrical pulses. Should the driver 170 comprise a solenoid, the actuating power may be a current of sufficient power. In response to receiving the actuating power, the driver 170 moves the pawl 140 to its release position against the force of the bias mechanism 150. In the illustrated form, this involves rotating the shaft 173 such that the nut 174 advances, thereby causing the projection 175 to engage the armature 148 and drive the pawl 140 to its release position.

Once the pawl 140 reaches its release position, the control assembly 180 may cause the driver 170 to return to its home position. For example, in embodiments in which the driver 170 comprises a stepper motor, the control assembly 180 may provide the stepper motor with a second series of electrical pulses that cause the motor 172 to operate in reverse, thereby retracting the nut 174. Should the driver 170 instead comprise a solenoid, the control assembly 180 may simply cease providing the solenoid with power to thereby cause the rod of the solenoid to return to its retracted position under an internal biasing force. Regardless of the precise form of the driver 170, return of the driver 170 to its home position does not necessarily cause the pawl 140 to return to its holding position due to the one-way engagement provided between the projection 175 and the armature 148.

In certain embodiments, the hold-open device 100 may have an active mode and an idle mode. In the active mode, the driver 170 may be controlled to return to the nut 174 to its retracted position once the pawl 140 reaches its release position, thereby freeing the pawl 140 to return to its holding position. Thus, when operating in the active mode, the reset mechanism 160 is able to return the pawl 140 to its holding position upon opening of the door 74 to thereby enable the hold-open device 100 to retain the door 74 in the last position to which it was opened. In the idle mode, the driver 170 may be controlled to retain the nut 174 in its advanced position to thereby hold the pawl 140 in its release position. Thus, when operating in the idle mode, the reset mechanism 160 is unable to return the pawl 140 to its holding position, and the hold-open device 100 is inoperable to retain the door 74 in the last position to which it was opened.

While not necessarily included in certain embodiments, the reduction gear set 130 may provide the hold-open device 100 with one or more advantages. As one example, the reduction gear set 130 reduces the torque applied to the pawl 140, which enables the use of lighter and less-expensive components, such as smaller and less-expensive forms of the pawl 140 and spring 154. The reduction gear set 130 also causes the ratchet wheel 136 to rotate to a greater degree than the pinion 94 rotates, which enables the hold-open device 100 to hold the door 74 in the last position to which it was opened with a greater degree of fidelity.

Figure 8:
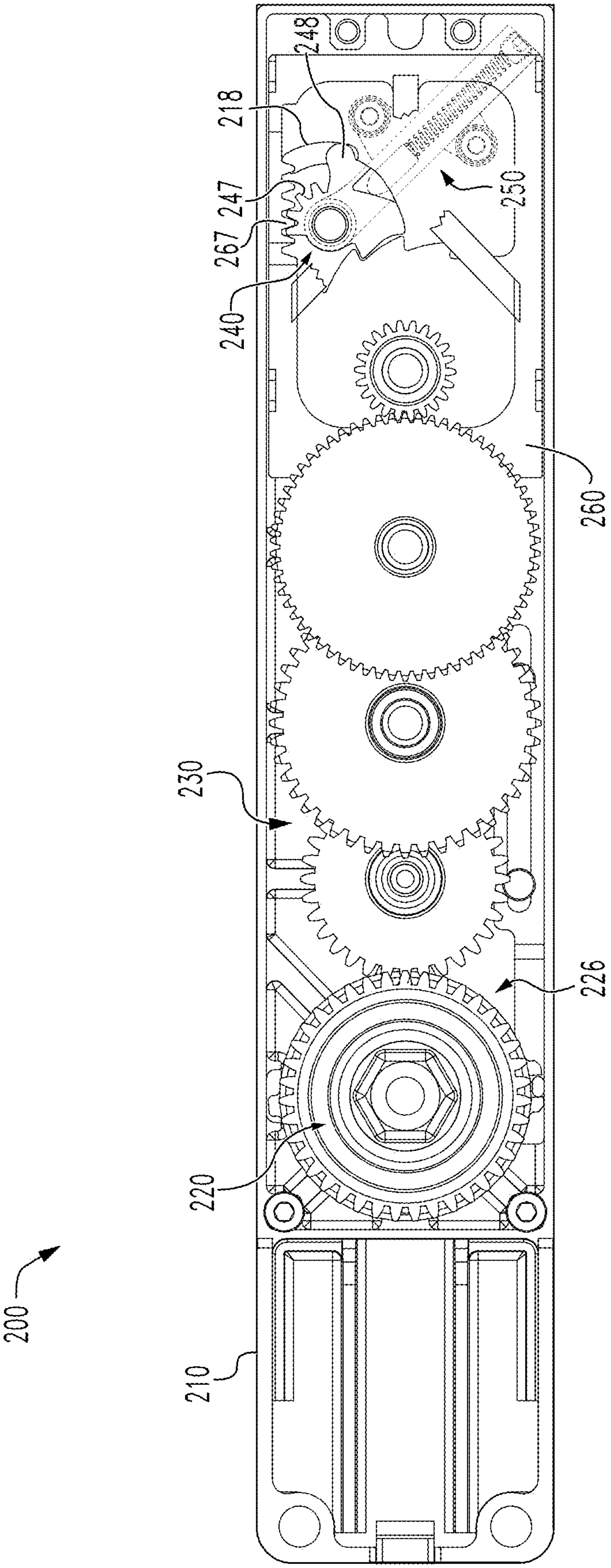
FIG. 8 is a plan view of a modular hold-open device according to certain embodiments.

With additional reference to FIG. 8, illustrated therein is a modular hold-open device 200 according to certain embodiments. The hold-open device 200 may, for example, be utilized in combination with the above-described door closer 90, for example in place of the hold-open device 100. The hold-open device 200 is substantially similar to the above-described hold-open device 100, and similar reference characters are used to indicate similar elements and features. For example, the hold-open device 200 generally includes a case 210, a pinion-engaging shaft 220, a reduction gear set 230, a pawl 240, a bias mechanism 250, and a reset mechanism 260, which respectively correspond to the above-described case 110, pinion-engaging shaft 120, reduction gear set 130, pawl 140, bias mechanism 150, and reset mechanism 160. In the interest of conciseness, the following description of the hold-open device 200 focuses primarily on features that differ from those described above with reference to the hold-open device 100.

The pawl 240 includes gear teeth 247 that mesh with corresponding gear teeth 267 formed on the reset mechanism 260 such that pivoting of the pawl 240 is correlated with translational shifting of the reset mechanism 260. The pawl 240 also includes a toggle arm 248 that projects through an opening 218 formed in the case 210. As described herein, the toggle arm 248 may be shifted by or on behalf a user in order to transition the hold-open device 200 between an active mode and an idle mode.

Figure 11:
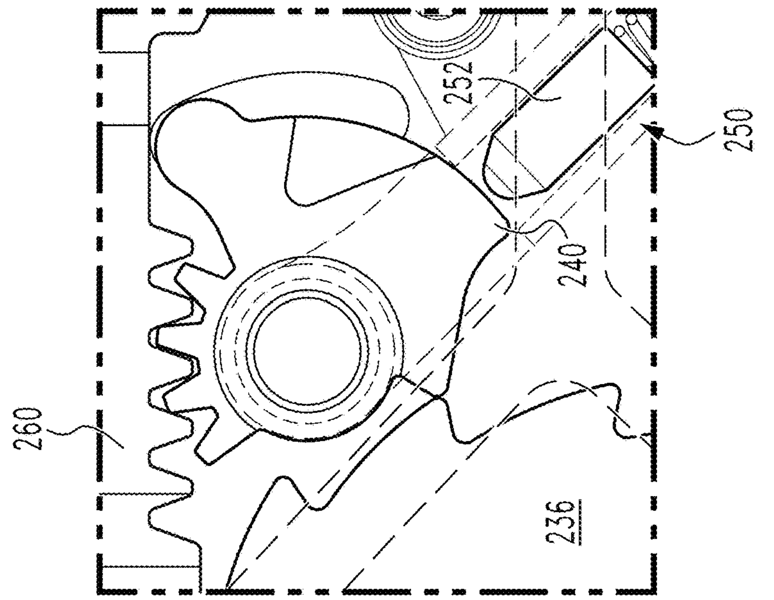
FIGS. 9-11 illustrate the hold-open device illustrated in FIG. 8 during a closing operation.
Figure 10:
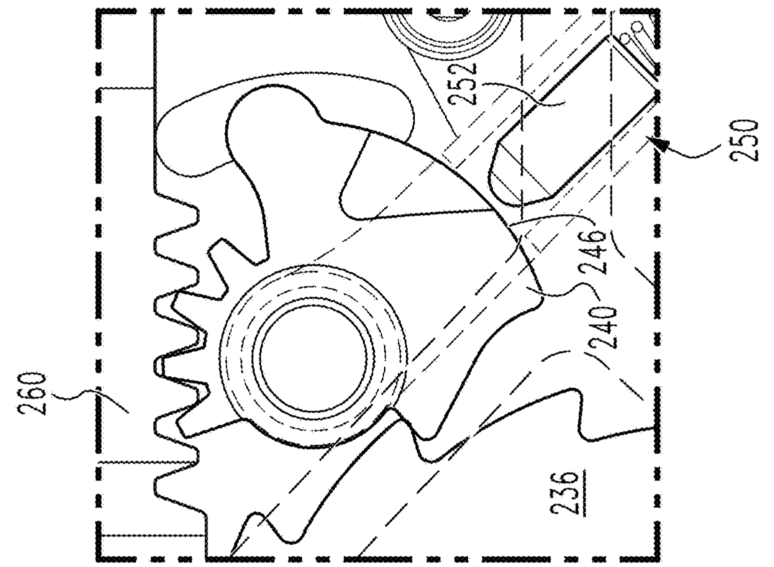
Figure 9:
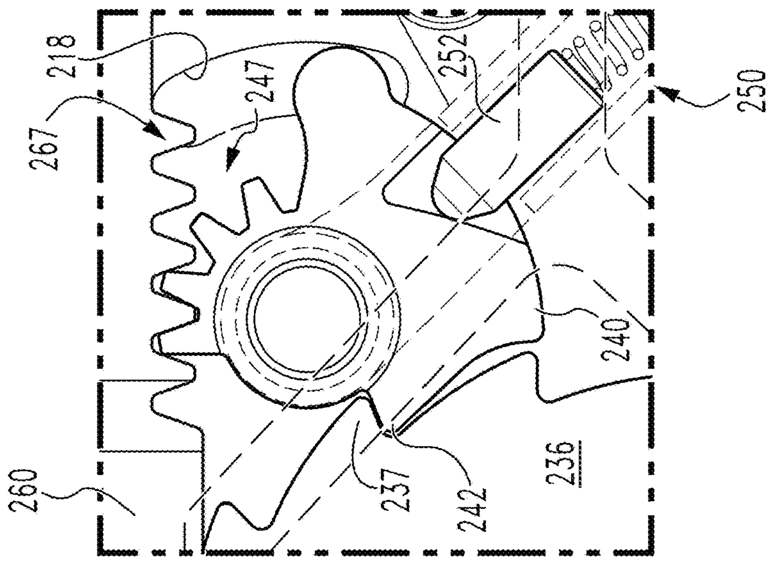

With additional reference to FIGS. 9-11, illustrated therein is a portion of the hold-open device 200 during a closing operation. More particularly, FIG. 9 illustrates the hold-open device 200 while holding the door 74 in an open position, and FIGS. 10 and 11 illustrate the hold-open device 200 during closing of the door 74 (e.g., after a threshold closing force is applied to the door 74). When the pawl 240 is in its holding position (FIG. 9), the pawl tooth 242 engages a tooth 237 of the ratchet wheel 236, and the bias mechanism 250 resists rotation of the pawl 240 (and thus of the gear set 230 and pinion-engaging shaft 220) in a manner analogous to that described above. When a threshold closing force is applied to the door 74, the ratchet wheel 236 urges the pawl 240 toward its release position (as illustrated in FIGS. 10 and 11) in a manner analogous to that described above. Due to the engagement of the teeth 247, 267, this pivoting of the pawl 240 from the holding position (FIG. 9) to the release position (FIG. 11) also shifts the reset mechanism 260 in a first longitudinal direction (to the left in FIGS. 9-11) from a first position (FIG. 9) to a second position (FIG. 11). As in the above-described embodiment, when the pawl 240 is in the release position, the pin 252 of the bias mechanism 250 exerts a small frictional force on the landing 246 to slightly resist pivoting of the pawl 240 from the release position, but the bias mechanism 250 exerts little to no biasing force on the pawl 240.

Figure 14:
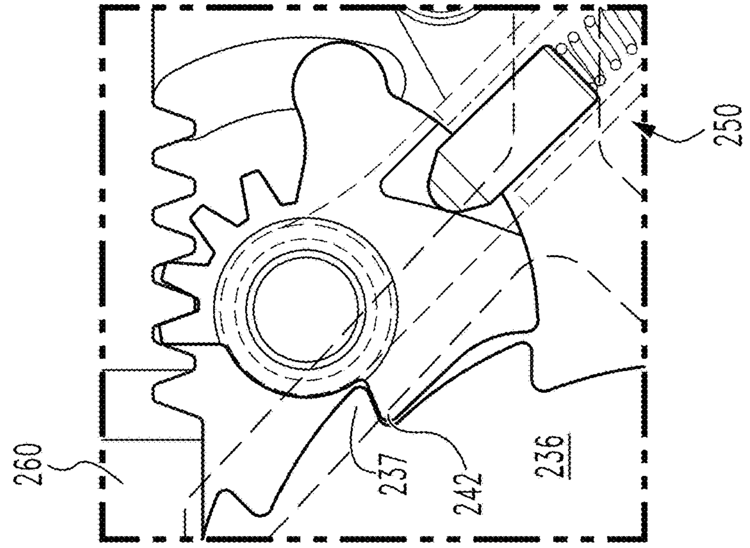
FIGS. 12-14 illustrate the hold-open device illustrated in FIG. 8 during a reset operation.
Figure 13:
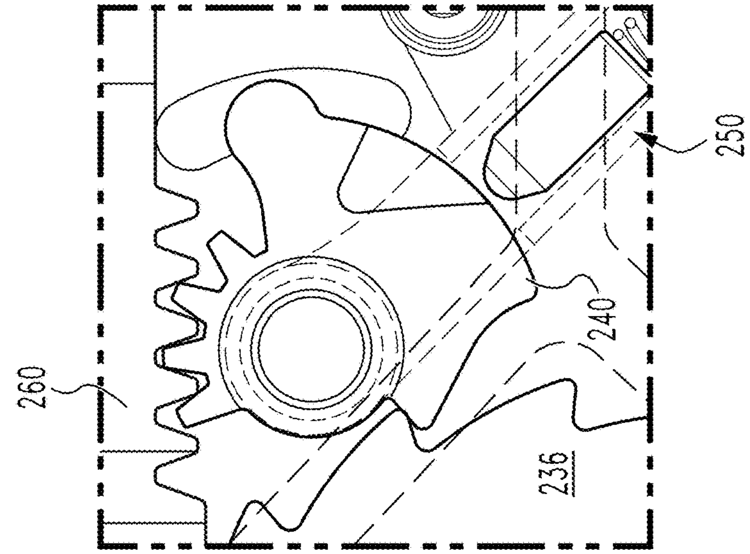
Figure 12:
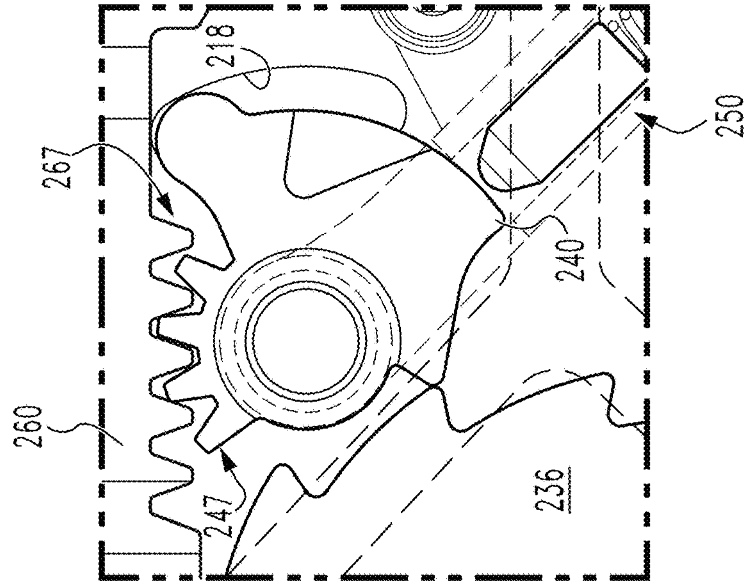

With additional reference to FIGS. 12-14, illustrated therein is a portion of the hold-open device 200 during a reset operation. When the door 74 is in its fully closed position, the pawl 240 is in its release position, as illustrated in FIG. 12. As the door 74 begins to open, rotation of the pinion-engaging shaft 220 shifts the reset mechanism 260 in a second longitudinal direction (to the right in FIGS. 12-14) from its second position (FIG. 12) to its first position (FIG. 14). Due to the engagement of the teeth 247, 267, this shifting of the reset mechanism 260 in the second longitudinal direction pivots the pawl 240 from the release position (FIG. 12) to the holding position (FIG. 14). Thus, upon opening of the door 74, the hold-open device 200 is once again ready and able to hold the door 74 to the last position to which it was opened. As described herein, should movement of the pawl 240 toward its holding position be prevented (e.g., due to engagement of the toggle arm 248 with a mode selector), the clutch 226 will slip such that the reset mechanism 260 and pawl 240 are capable of remaining in their current positions.

As should be evident from the foregoing, the pawl 240 is operable to move between its holding position and its release position during an open-close cycle of the door 74. For example, when the door 74 is released while in an open position, the pawl 240 adopts the holding position, as illustrated in FIG. 9. When a threshold closing force is applied to the door 74, the pawl 240 pivots toward the release position to facilitate further closing movement of the door 74, for example as illustrated in FIGS. 10 and 11. When the door 74 is subsequently opened, the reset mechanism 260 returns the pawl 240 to its holding position, as illustrated in FIGS. 12-14. However, in certain circumstances, it may be desirable to have the option of disabling the hold-open functionality of the hold-open device 200. In such situations, the hold-open device 200 may be provided with a modular mode selection device, such as the modular mode selection device 300 illustrated in FIGS. 15-18.

Figure 15:
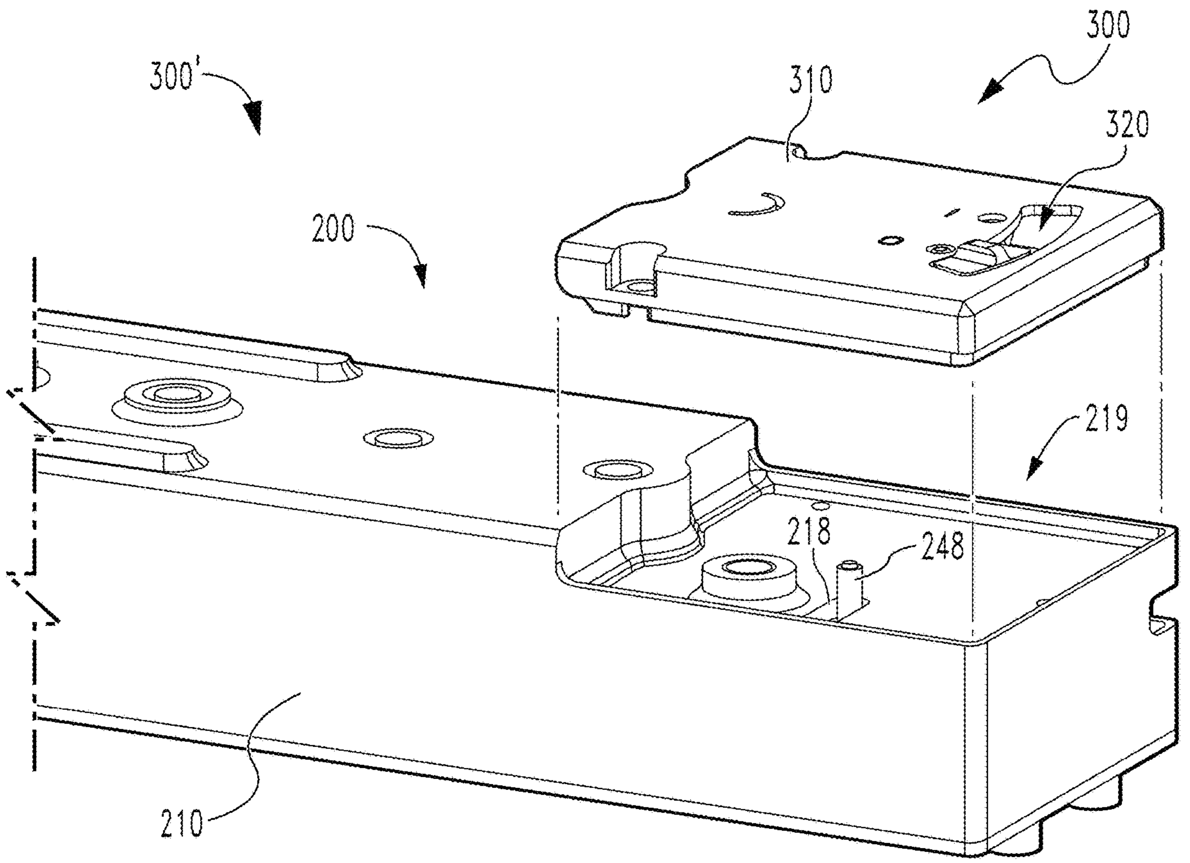
FIG. 15 is a partially-exploded assembly view of an assembly including the hold-open device illustrated in FIG. 8 and a mode selection device according to certain embodiments.

With additional reference to FIG. 15, illustrated therein is an assembly 300' including the hold-open device 200 and a modular mode selection device 300 according to certain embodiments. The illustrated housing 210 includes a receptacle 219 operable to receive the mode selection device 300, and in the illustrated form, the toggle arm 248 projects into the receptacle 219 such that the mode selection device 300 is operable to engage the toggle arm 248 as described herein. It is also contemplated that the toggle arm 248 may not necessarily project into the receptacle 219, and that a portion of the mode selection device 300 may instead project into the housing 210 for engagement with the toggle arm 248.

Figure 16:
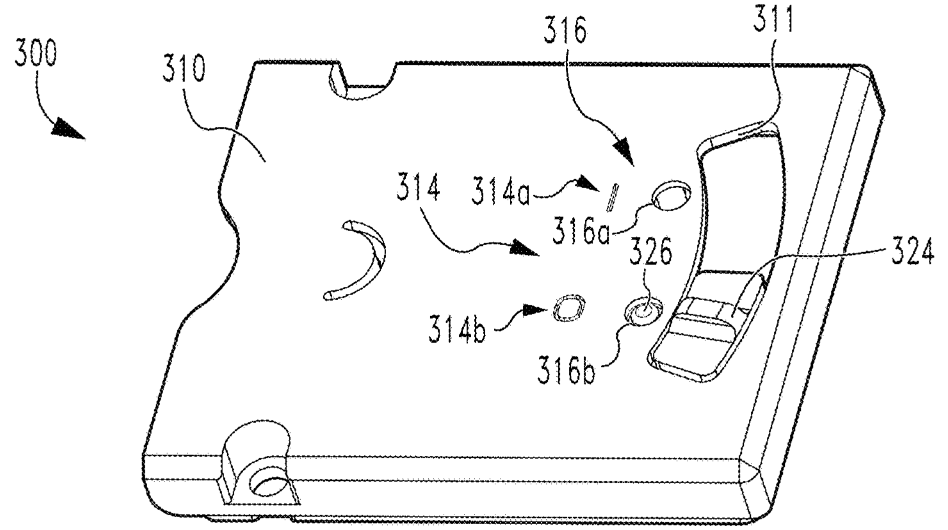
FIG. 16 is a perspective view of the mode selection device illustrated in FIG. 15.

With additional reference to FIG. 16, the mode selection device 300 generally includes a housing 310 and a selector 320 movably mounted in the housing 310. As described herein, the selector 320 is movable relative to the housing 310 between an active position and an idle position such that when the mode selection device 300 is mounted in the receptacle 219, the mode selection device 300 is operable to transition the hold-open device 200 between an active mode and an idle mode.

In certain embodiments, the housing 310 may include one or more indicia 314 configured to identify the current mode of the hold-open device 200 based upon the position of the selector 320. For example, the housing 310 may include a first indicium 314*a* configured to indicate that the hold-open device 200 is operating in a first mode when an indicator 324 of the selector 320 is aligned with the first indicium 314*a*. The housing 310 may further include a second indicium 314*b* configured to indicate that the hold-open device 200 is operating in a second mode when the indicator 324 of the selector 320 is aligned with the second indicium 314*b*. In the illustrated form, the first indicium 314*a* comprises an "I" to indicate that the hold-open device 200 is on or in its active mode, and the second indicium comprises an "O" to indicate that the hold-open device 200 is off or in its idle mode. It is also contemplated that the one or more indicia 314 may take other forms, including but not limited to those including words, symbols, graphics, letters, colors, and other forms of indicia.

In certain embodiments, the housing 310 may include one or more detent features 316 operable to engage a corresponding detent feature 326 on the selector 320 to resist movement of the selector 320 from the active position and/or the idle position. For example, the housing 310 may include a first detent feature 316*a* operable to engage the selector detent feature 326 to resist movement of the selector 320 from a first position (e.g., one of the active position or the idle position). The housing 310 may further include a second detent feature 316*b* operable to engage the selector detent feature 326 to thereby resist movement of the selector 320 from a second position (e.g., the other of the active position or the idle position). In the illustrated form, each housing detent feature 316 is provided in the form of an opening, and the selector detent feature 326 is provided in the form of a projection sized and shaped to be received in the openings of the housing detent features 316*a*, 316*b*. It is also contemplated that the detent features 316, 326 may take another form. By way of example, the housing detent feature(s) 316 may be provided in the form of a projection, and the selector detent feature(s) 326 may be provided in the form of an opening sized and shaped to receive the projection(s).

Figure 18:
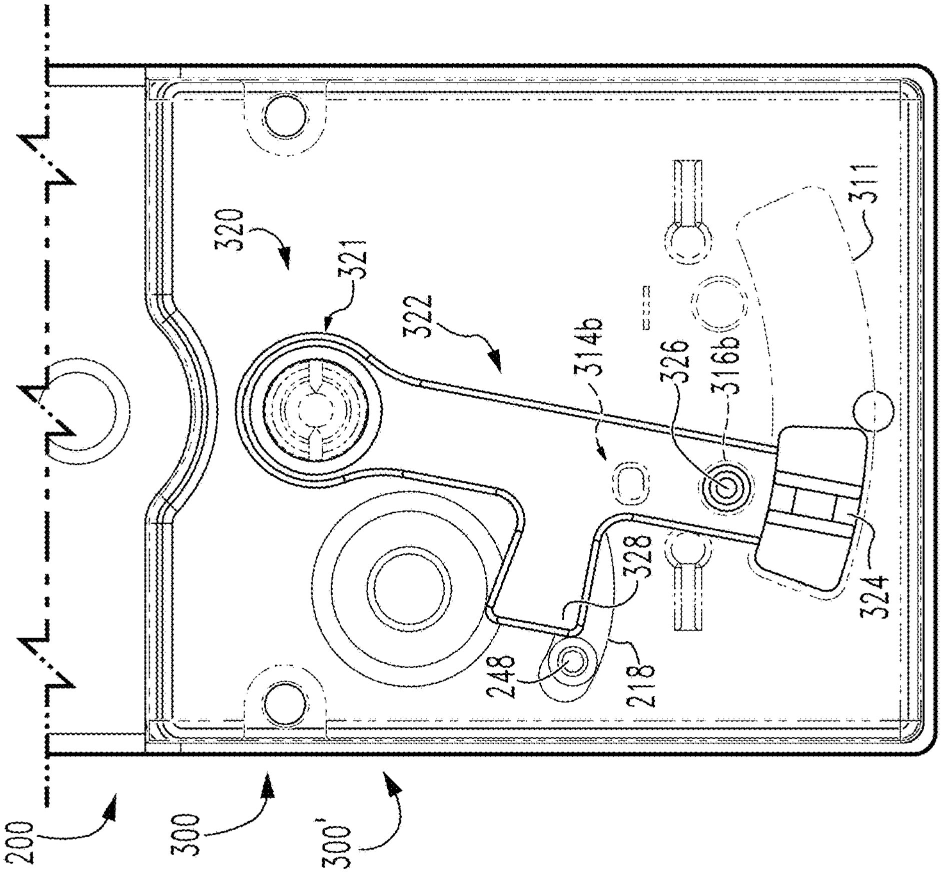
FIG. 18 is a plan view of the assembly illustrated in FIG. 15 while in an idle mode.
Figure 17:
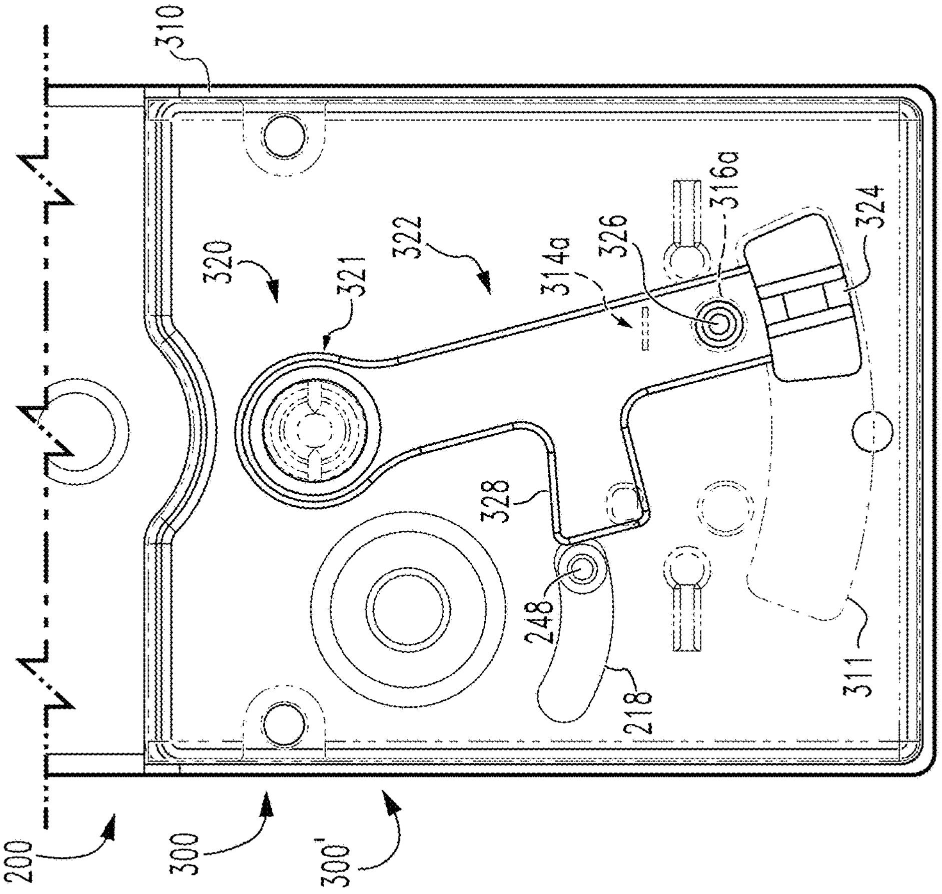
FIG. 17 is a plan view of the assembly illustrated in FIG. 15 while in an active mode.

With additional reference to FIGS. 17 and 18, the selector 320 is movably mounted to the housing 310 for movement between an active position (FIG. 17) and an idle position (FIG. 18). As described herein, the mode selection device 300 sets the hold-open device 200 to the active mode when the selector 320 is in the active position, and sets the hold-open device 200 to the idle mode when the selector 320 is in the idle position. In the illustrated form, the selector 320 is mounted for pivotal movement between the active position and the idle position. It is also contemplated that the selector 320 may be mounted for another form of movement between the active position and the idle position, such as translational movement.

In the illustrated form, the selector 320 generally includes a hub 321 and an arm 322 extending from the hub 321, and the selector 320 is pivotably mounted to the housing 310 at the hub 321. The arm 322 includes the indicator 324 and the selector detent feature 326, and is operable to engage the toggle arm 248. For example, the arm 322 may include a finger 328 operable to engage the toggle arm 248. While other forms are contemplated, in the illustrated form, the indicator 324 is provided in the form of a projection or flange that projects through an arcuate slot 311 formed in the housing 310 and facilitates manual adjustment of the selector 320 between its active position and its idle position.

When the selector 320 is in its active position (FIG. 17), the finger 328 does not prevent movement of the toggle arm 248 such that movement of the pawl 240 between its holding position and its release position is uninhibited. As a result, the pawl 240 is operable to move in the manner described above with reference to FIGS. 9-14 to selectively hold the door 74 in the last position to which it was opened. The hold-open device 200 is thus in its active mode, as indicated by alignment of the indicator 324 with the "active" indicia 314*a*. In the illustrated embodiment, movement of the selector 320 from its active position is resisted by engagement of the selector detent feature 326 with the first housing detent feature 316*a*.

From the active position (FIG. 17), the selector 320 may be manually moved to its idle position (FIG. 18) by application of one or more appropriate forces to the arm 322. In certain embodiments, the indicator 324 may first be depressed in order to disengage the detent features 316*a*, 326, thereby freeing the selector 320 for pivotal movement to its idle position. In certain embodiments, the detent features 316*a*, 316*b* and/or the detent feature 326 may include one or more ramps that cause disengagement of the detent feature 326 from an engaged one of the detent features 316*a*, 316*b* when an appropriate pushing force is applied to the indicator 324. In certain embodiments, the selector 320 may be formed of a resilient material such that the detent feature 326 snaps into engagement with the detent features 316*a*, 316*b* once the detent feature 326 is aligned with one of the detent features 316*a*, 316*b*.

As the selector 320 moves toward its idle position (FIG. 18), the finger 328 engages the toggle arm 248 to thereby urge the pawl 240 toward its release position. When the selector 320 is in its idle position, the finger 328 is engaged with the toggle arm 248 and retains the pawl 240 in its release position. As noted above with reference to FIGS. 12-14, the reset mechanism 260 urges the pawl 240 toward its holding position during opening movement of the door 74. However, this urging is resisted by the selector 320, which is retained in its idle position due to engagement of the detent features 316*b*, 326. With movement of the pawl 240 toward its holding position being temporarily prevented by the selector 320, the clutch 226 slips, thereby permitting the reset mechanism 260 and pawl 240 to remain in their current positions. With the pawl 240 retained in its release position, the hold-open device 200 is inoperable to retain the door 74 in the last position to which it was opened. The hold-open device 200 is thus in its idle mode, as indicated by alignment of the indicator 324 with the "idle" indicia 314*b*.

In the illustrated form, the hold-open device 200 is provided with the mode selection device 300 in an assembly 300'. It is also contemplated that the hold-open device 200 and the mode selection device 300 may be provided separately. For example, the hold-open device 200 may be sold as a base unit, and the mode selection device 300 may be provided as an optional add-on for the hold-open device 200. Moreover, while the illustrated mode selection device 300 is provided in the form of a modular add-on for the hold-open device 200, it is also contemplated that one or more features of the mode selection device 300 may be bodily incorporated into the hold-open device 200 to provide the hold-open device 200 with mode selection capabilities.

In the illustrated form, the mode selection device 300 is wholly mechanical, and mode selection is performed manually by a user. It is also contemplated that the mode selection device 300 may include one or more electronic and/or electromechanical features. For example, the mode selection device 300 may include an electromechanical actuator operable to selectively retain the pawl 240 in its release position to thereby set the hold-open device 200 in its idle state. In certain embodiments, the mode selection device 300 may include an onboard power supply to power the actuator. In certain embodiments, an electromechanical form of the mode selection device 300 may be manually-operable. For example, an electromechanical form of the mode selection device 300 may include a button or switch that transitions the mode selection device 300 between its active-setting configuration and its idle-setting configuration. Additionally or alternatively, an electromechanical form of the mode selection device 300 may include a wired or wireless communication device to facilitate remote adjustment of the hold-open device 200 between its active mode and its idle mode.

Figure 19:
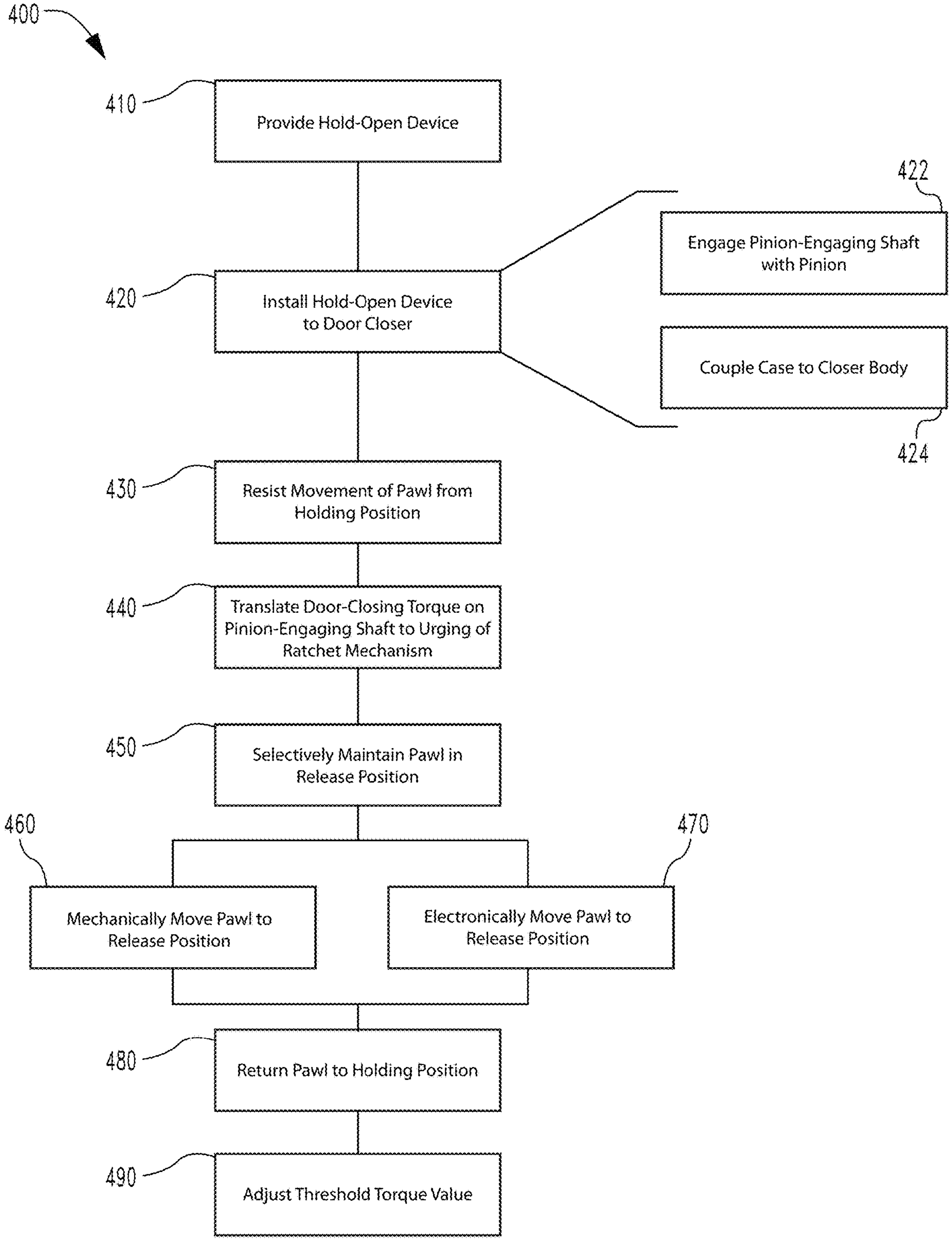
FIG. 19 is a schematic flow diagram of a process according to certain embodiments.

With additional reference to FIG. 19, an exemplary process 400 that may be performed using the illustrated hold-open devices 100, 200 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 400 is described herein with specific reference to the door closer 90 and hold-open device 100 illustrated in FIGS. 1-7, it is to be appreciated that the process 400 may be performed with door closers and/or hold-open devices having additional or alternative features. For example, although the process 400 is described with specific reference to the hold-open device 100, it should be understood that the process 400 may be performed with the hold-open device 200 illustrated in FIGS. 8-18.

The process 400 may begin with block 410, which generally involves providing a modular hold-open device configured for use with a door closer comprising a body and a pinion rotatably mounted to the body, the modular hold-open device comprising a case, a pinion-engaging shaft rotatably mounted in the case, a ratchet mechanism movably mounted in the case, a pawl movably mounted in the case, and a bias mechanism mounted in the case. For example, block 410 may involve providing the above-described modular hold-open device 100, which includes a case 110, a pinion-engaging shaft 120 rotatably mounted in the case 110, a ratchet mechanism 136 movably mounted in the case 110, a pawl 140 movably mounted in the case 110, and a bias mechanism 150 mounted in the case 110. It is also contemplated that block 410 may involve providing a hold-open device of another configuration, such as one in which one or more of the above-described components is provided in another form or is omitted.

The process 400 may include block 420, which generally involves installing the hold-open device to the door closer. Block 420 may, for example, involve installing the hold-open device 100 to the door closer 90. Block 420 generally includes blocks 422 and 424. Block 422 generally involves engaging the pinion-engaging shaft with the pinion. For example, block 422 may involve engaging the pinion-engaging shaft 120 with the pinion 94 by inserting the exposed end portion 95 of the pinion 94 into the recess 123 such that the pinion 94 and the shaft 120 are rotationally coupled with one another. Block 424 generally involves securing the case to the body of the door closer. Block 424 may, for example, involve securing the case 110 to the closer body 92 using fasteners 101 such as bolts. It should be appreciated that the installing of block 420 need not involve dismounting the closer 90 from the closure assembly 70, as the illustrated modular hold-open device 100 is capable of being installed without requiring such dismounting.

The process 400 may include block 430, which generally involves resisting movement of the pawl from a holding position toward a release position, wherein the pawl in the holding position prevents movement of the ratchet mechanism in a first ratchet mechanism direction, and wherein the pawl in the release position permits movement of the ratchet mechanism in the first ratchet mechanism direction. Block 430 may be performed at least in part by a bias mechanism such as the bias mechanism 150. Block 430 may, for example, involve resisting movement of the pawl 140 from the holding position to the release position using the bias mechanism 150 as described above. As noted above, the pawl 140 in its holding position (FIG. 4) prevents movement of the ratchet wheel 136 in the first rotational direction (clockwise in FIG. 4), which is correlated with movement of the pinion-engaging shaft 120 in the door-closing direction. As also noted above, the pawl 140 in its release position (FIG. 5) permits movement of the ratchet wheel 136 in the first rotational direction.

The process 400 may include block 440, which may be performed in response to a first torque exerted on the pinion-engaging shaft in a door-closing direction, and which generally involves urging the ratchet mechanism in the first ratchet mechanism direction, thereby urging the pawl toward the release position. For example, block 440 may be performed in response to the pinion 94 exerting on the pinion-engaging shaft 120 a torque in the door-closing direction, and may involve urging the ratchet wheel 136 to rotate in the first rotational direction, thereby urging the pawl 140 toward its release position. It is also contemplated that block 440 may involve urging the ratchet mechanism in the first ratchet mechanism direction in another manner. For example, block 440 may involve linearly urging a linear ratchet mechanism in a first linear direction as described above.

The process 400 may further include block 450, which may be performed when the torque exerted on the pinion-engaging shaft is less than a threshold torque value, and which generally involves selectively maintaining the pawl in the holding position, thereby preventing rotation of the pinion-engaging shaft in the door-closing direction. For example, block 450 may involve the bias mechanism 150 maintaining the pawl 140 in its holding position when the torque exerted on the shaft 120 by the pinion 94 is less than the threshold torque value. As will be appreciated, the threshold torque value is greater than the torque normally supplied by the closer 90 such that the biasing force normally provided by the closer 90 does not drive the pawl 140 to the release position, which would permit closing of the door 74. As a result of block 450, the door 74 is held in the last position to which it was opened.

The process 400 further includes moving the pawl to the release position, thereby transitioning the hold-open device to its releasing state. In certain embodiments and/or circumstances, moving the pawl to the release position may be performed mechanically, for example as described below with reference to block 460. Additionally or alternatively, moving the pawl to the release position may be performed electronically, for example as described below with reference to block 470.

In certain embodiments and/or circumstances, the process 400 may include block 460, which generally involves mechanically moving the pawl to the release position, for example in response to the torque applied to the pinion-engaging shaft exceeding the threshold torque value. In the illustrated embodiment, block 460 involves the ratchet wheel 136 driving the pawl 140 to its release position against the force of the bias mechanism 150 as described above with reference to the hold-open device 100. It is also contemplated that the reset mechanism may move the pawl to the holding position during an opening movement of the door, for example as described above with reference to the hold-open device 200.

In certain embodiments and/or circumstances, the process 400 may include block 470, which generally involves electronically moving the pawl to the release position, for example in response to a door close signal. Block 470 generally involves operating an electrically-operable driver to move the pawl from the holding position to the release position in response to a door close signal. Block 470 may, for example, involve the control assembly 180 operating the driver 170 to move the pawl 140 from its holding position to its release position in response to a door close signal, such as one received via the communications device 186. Further details regarding example embodiments of the driver 170 moving the pawl 140 to the release position are provided above.

The process 400 may further include block 480, which generally involves operating a reset mechanism of the hold-open device to return the pawl to the holding position in response to the pinion-engaging shaft reaching a door closed position. Block 480 may, for example, involve operating the reset mechanism 160 to return the pawl 140 to its holding position in response to the pinion-engaging shaft 120 reaching a door closed position, for example as described above.

The process 400 may further include block 490, which generally involves adjusting the threshold torque value by manipulating an adjustment mechanism. Block 490 may, for example, involve advancing and/or retracting the set screw 156. For example, should the threshold torque be too high, block 490 may involve rotating the set screw 156 in a first direction to retract the set screw 156, thereby decreasing the preload of the spring 154. Should the threshold torque be too low, block 490 may involve rotating the set screw 156 in an opposite second direction to advance the set screw 156, thereby increasing the preload of the spring 154.

Those skilled in the art will readily recognize that blocks 430-480 generally relate to performance of the process 400 while the hold-open device is in its active mode. Should the hold-open device be operable in an idle mode, operation of the hold-open device may involve steps along the lines of those outlined in the process 500 illustrated in FIG. 20.

Figure 20:
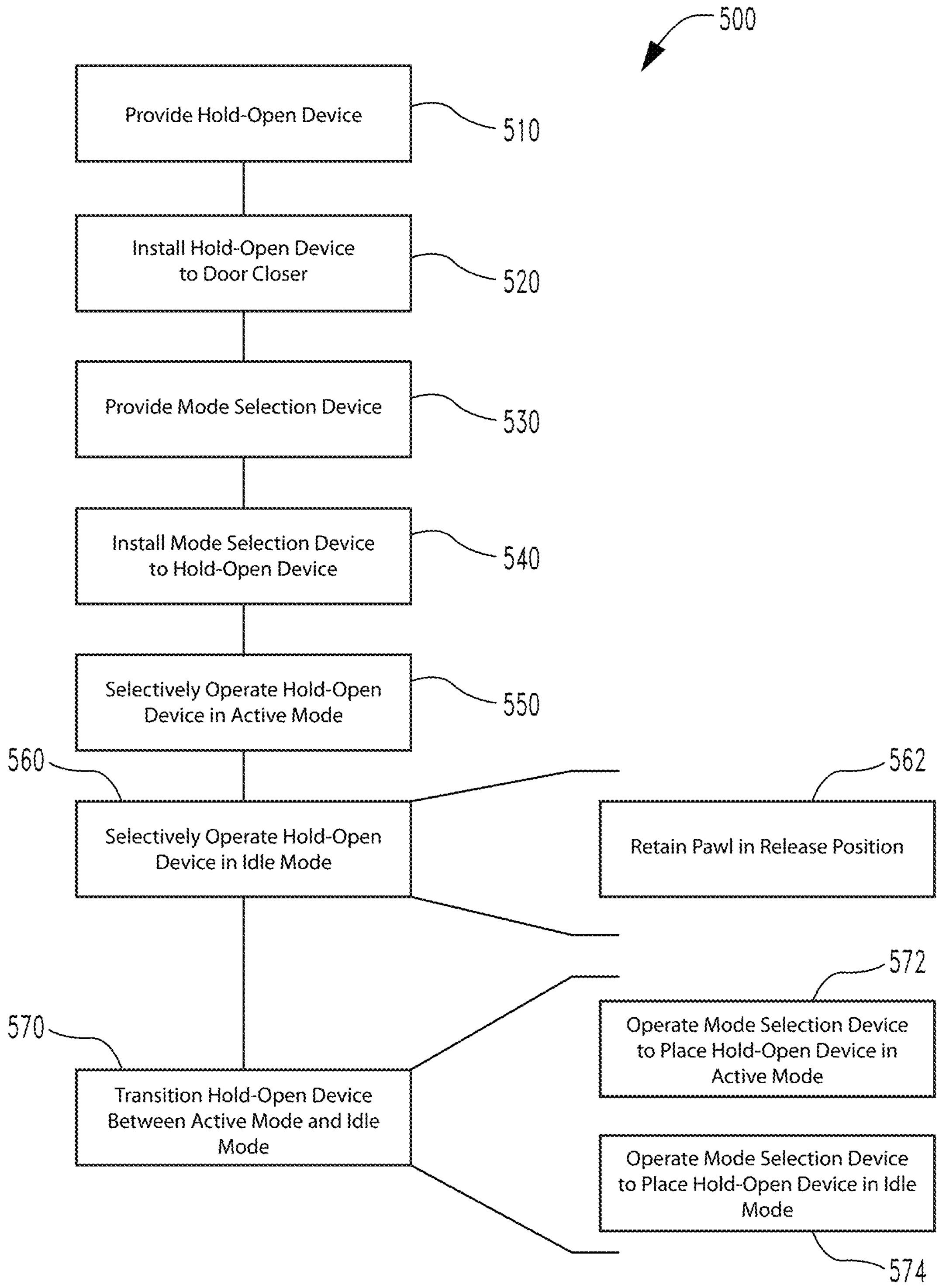
FIG. 20 is a schematic flow diagram of a process according to certain embodiments.

With additional reference to FIG. 20, an exemplary process 500 that may be performed using the illustrated hold-open devices 100, 200 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described herein with specific reference to the door closer 90, the hold-open device 100 illustrated in FIGS. 1-7, and the assembly 300' illustrated in FIGS. 8-18, it is to be appreciated that the process 400 may be performed with door closers, hold-open devices, and/or assemblies having additional or alternative features.

The process 500 may begin with block 510, which generally involves providing a modular hold-open device. In certain embodiments, block 510 may involve providing the hold-open device 100 illustrated in FIGS. 1-7, for example as described above with reference to block 410 of the process 400. It is also contemplated that block 510 may involve providing the hold-open device 200 illustrated in FIGS. 8-18, or a hold-open device having additional or alternative features. The modular hold-open device provided in block 510 has an active mode and an idle mode. The hold-open device may be operable to retain a door in the last position to which the door was opened when operated in the active mode, and may be inoperable to retain the door in the last position to which the door was opened when operated in the idle mode.

The process 500 may include block 520, which generally involves installing the hold-open device to a door closer. For example, block 520 may involve installing the hold-open device 100 or the hold-open device 200 to the door closer 90 along the lines set forth above with reference to block 420 of the process 400.

In certain embodiments, the process 500 may include block 530, which generally involves providing a mode selection device operable to transition the hold-open device provided in block 510 between its active mode and its idle mode. In certain embodiments, block 530 may involve providing the mechanical mode selection device 300 illustrated in FIGS. 15-18. In certain embodiments, block 530 may involve providing an electromechanical mode selection device along the lines set forth above.

In certain embodiments, the process 500 may include block 540, which generally involves installing the mode selection device provided in block 530 to the hold-open device provided in block 510. For example, block 540 may involve positioning the mode selection device 300 in the receptacle 219 and securing the housing 310 to the case 210 using one or more fasteners.

In the illustrated form, the process 500 includes providing a modular mode selection device in block 530 and installing the mode selection device to the hold-open device in block 540. It is also contemplated that one or both of blocks 530 and 540 may be omitted in certain embodiments. For example, the hold-open device provided in block 510 may include the capability of transitioning between its active mode and its idle mode without a modular add-on, or the modular mode selection device may be pre-installed to the hold-open device as part of an assembly (e.g., the assembly 300').

With the hold-open device installed to the door closer, the process 500 may proceed to block 550, which generally involves operating the hold-open device in its active mode. Block 550 may, for example, proceed along the lines outlined above with reference to blocks 430-480 of the process 400. When operating the hold-open device in its active mode, the hold-open device is operable to hold the door 74 in the last position to which the door was opened as described above.

The process 500 further includes block 560, which generally involves selectively operating the hold-open device in its idle mode. Block 560 may include block 562, which generally involves retaining the pawl of the hold-open device in its release position. For example, in embodiments in which the hold-open device is provided along the lines of the hold-open device 100, block 562 may involve retaining the nut 174 in its advanced position to thereby hold the pawl 140 in its release position. In embodiments in which the hold-open device is provided along the lines of the hold-open device 200 and the mode selection device is provided along the lines of the mode selection device 300, block 562 may involve retaining the pawl 240 in its release position via one or more detents, for example as described above with reference to the assembly 300'. During the idle mode operation of block 560, the hold-open device may be inoperable to retain the door in the last position to which it was opened.

The process 500 further includes block 570, which generally involves transitioning the hold-open device between its active mode and its idle mode. In certain embodiments, block 570 may involve block 572 and block 574. Block 572 generally involves operating the mode selection device to place the hold-open device in its active mode. For example, in embodiments in which the mode selection device is provided along the lines of the mode selection device 300, block 572 may involve moving the selector 320 from its idle position to its active position as described above. Block 574 generally involves operating the mode selection device to place the hold-open device in its idle mode. For example, in embodiments in which the mode selection device is provided along the lines of the mode selection device 300, block 574 may involve moving the selector 320 from its active position to its idle position as described above.

In certain embodiments, the transitioning of block 570 may be performed manually, for example as described above with reference to the mode selection device 300. It is also contemplated that the transitioning of block 570 may be performed at least partially electronically. For example, block 570 may involve transmitting to control circuitry (e.g., the control circuitry 182 of the hold-open device 100 or control circuitry of an electromechanical embodiment of the mode selection device 300) a transition signal that causes the control circuitry to transition the hold-open device between its active state and its idle state. In certain embodiments, the transition signal may be sent from an external device 50. In certain embodiments, the transition signal may be generated by the mode selection device, for example in embodiments in which the mode selection device includes a button, switch, or other device operable to generate a signal to which the control circuitry is responsive.

Figure 21:
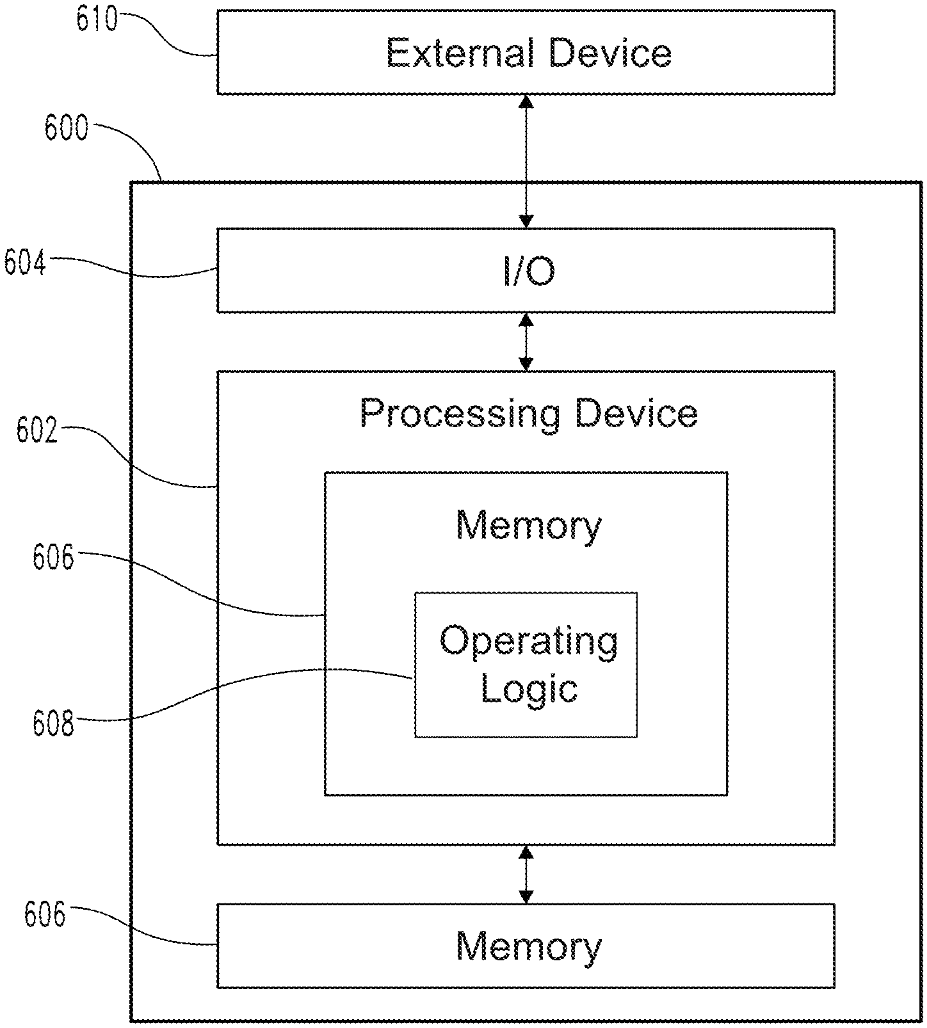
FIG. 21 is a schematic block diagram of a computing device according to certain embodiments.

Referring now to FIG. 21, a simplified block diagram of at least one embodiment of a computing device 600 is shown. The illustrative computing device 600 depicts at least one embodiment of a controller that may be utilized in connection with the control circuitry 182 illustrated in FIG. 7 and/or control circuitry of a modular mode selection device. As noted above, however, certain embodiments of control circuitry may not necessarily utilize a computing device.

Depending on the particular embodiment, the computing device 600 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 600 includes a processing device 602 that executes algorithms and/or processes data in accordance with operating logic 608, an input/output device 604 that enables communication between the computing device 600 and one or more external devices 610, and memory 606 which stores, for example, data received from the external device 610 via the input/output device 604.

The input/output device 604 allows the computing device 600 to communicate with the external device 610. For example, the input/output device 604 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 600. The input/output device 604 may include hardware, software, and/or firmware suitable for performing the techniques described herein.

The external device 610 may be any type of device that allows data to be inputted or outputted from the computing device 600. For example, in various embodiments, the external device 610 may be embodied as the external device 50 (e.g., an access control system 52 and/or a mobile device 54), the sensor(s) 188, or the driver 170. Further, in some embodiments, the external device 610 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 610 may be integrated into the computing device 600.

The processing device 602 may be embodied as any type of processor(s) capable of performing the functions described herein. In particular, the processing device 602 may be embodied as one or more single or multi-core processors, microcontrollers, or other processor or processing/controlling circuits. For example, in some embodiments, the processing device 602 may include or be embodied as an arithmetic logic unit (ALU), central processing unit (CPU), digital signal processor (DSP), and/or another suitable processor(s). The processing device 602 may be a programmable type, a dedicated hardwired state machine, or a combination thereof. Processing devices 602 with multiple processing units may utilize distributed, pipelined, and/or parallel processing in various embodiments. Further, the processing device 602 may be dedicated to performance of just the operations described herein, or may be utilized in one or more additional applications. In the illustrative embodiment, the processing device 602 is of a programmable variety that executes algorithms and/or processes data in accordance with operating logic 608 as defined by programming instructions (such as software or firmware) stored in memory 606. Additionally or alternatively, the operating logic 608 for processing device 602 may be at least partially defined by hardwired logic or other hardware. Further, the processing device 602 may include one or more components of any type suitable to process the signals received from input/output device 604 or from other components or devices and to provide desired output signals. Such components may include digital circuitry, analog circuitry, or a combination thereof.

The memory 606 may be of one or more types of non-transitory computer-readable media, such as a solid-state memory, electromagnetic memory, optical memory, or a combination thereof. Furthermore, the memory 606 may be volatile and/or nonvolatile and, in some embodiments, some or all of the memory 606 may be of a portable variety, such as a disk, tape, memory stick, cartridge, and/or other suitable portable memory. In operation, the memory 606 may store various data and software used during operation of the computing device 600 such as operating systems, applications, programs, libraries, and drivers. It should be appreciated that the memory 606 may store data that is manipulated by the operating logic 608 of processing device 602, such as, for example, data representative of signals received from and/or sent to the input/output device 604 in addition to or in lieu of storing programming instructions defining operating logic 608. As illustrated, the memory 606 may be included with the processing device 602 and/or coupled to the processing device 602 depending on the particular embodiment. For example, in some embodiments, the processing device 602, the memory 606, and/or other components of the computing device 600 may form a portion of a system-on-a-chip (SoC) and be incorporated on a single integrated circuit chip.

In some embodiments, various components of the computing device 600 (e.g., the processing device 602 and the memory 606) may be communicatively coupled via an input/output subsystem, which may be embodied as circuitry and/or components to facilitate input/output operations with the processing device 602, the memory 606, and other components of the computing device 600. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 600 may include other or additional components, such as those commonly found in a typical computing device (e.g., various input/output devices and/or other components), in other embodiments. It should be further appreciated that one or more of the components of the computing device 600 described herein may be distributed across multiple computing devices. In other words, the techniques described herein may be employed by a computing system that includes one or more computing devices. Additionally, although only a single processing device 602, I/O device 604, and memory 606 are illustratively shown in FIG. 9, it should be appreciated that a particular computing device 600 may include multiple processing devices 602, I/O devices 604, and/or memories 606 in other embodiments. Further, in some embodiments, more than one external device 610 may be in communication with the computing device 600.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A hold-open device configured for use with a door closer comprising a body and a pinion that is rotatably mounted to the body and rotationally biased in a door-closing direction by a biasing torque, the hold-open device comprising:

a ratchet wheel operable to engage the pinion such that rotation of the pinion in the door-closing direction causes rotation of the ratchet wheel in a first rotational direction; and a pawl operable to engage the ratchet wheel, the pawl having a holding position in which the pawl prevents rotation of the ratchet wheel in the first rotational direction to thereby prevent rotation of the pinion in the door-closing direction, the pawl having a release position in which the pawl permits rotation of the ratchet wheel in the first rotational direction to thereby permit rotation of the pinion in the door-closing direction; and wherein the ratchet wheel is configured to drive the pawl from the holding position to the release position in response to application of a threshold door-closing torque to the pinion to thereby permit rotation of the pinion in the door-closing direction.

2. The hold-open device of claim 1, further comprising a shaft engaged with the ratchet wheel; and wherein the ratchet wheel is operable to engage the pinion via the shaft.

3. The hold-open device of claim 2, wherein the ratchet wheel is engaged with the shaft via a reduction gear set.

4. The hold-open device of claim 2, wherein the ratchet wheel is connected with the shaft via a one-way bearing configured to transmit a door-closing rotation of the shaft to the ratchet wheel and to not transmit a door-opening rotation of the shaft to the ratchet wheel.

5. The hold-open device of claim 1, further comprising an adjustment mechanism operable to adjust the threshold door-closing torque.

6. The hold-open device of claim 1, further comprising a bias mechanism urging the pawl toward the holding position.

7. A door closer assembly comprising the hold-open device of claim 1;

wherein the door closer assembly further comprises the door closer; and wherein the ratchet wheel is engaged with the pinion such that rotation of the pinion in the door-closing direction causes rotation of the ratchet wheel in the first rotational direction.

8. The door closer assembly of claim 7, wherein the threshold door-closing torque is greater than the biasing torque.

9. A door closer assembly, comprising:

a closer body;

a pinion rotatably mounted to the closer body, wherein the pinion is rotationally biased in a door-closing direction by a biasing torque and is operable to rotate in a door-opening direction opposite the door-closing direction; and a hold-open device comprising a first component operably engaged with the pinion such that rotation of the pinion is correlated with movement of the first component, the hold-open device comprising a second component operable to mechanically and movably engage the first component to prevent rotation of the pinion in the door-closing direction when a door-closing torque on the pinion is less than a threshold torque, and to permit rotation of the pinion in the door-closing direction when the door-closing torque on the pinion is greater than the threshold torque.

10. The door closer assembly of claim 9, further comprising an adjustment mechanism operable to adjust the threshold torque.

11. The door closer assembly of claim 9, wherein the threshold torque is greater than the biasing torque.

12. A door closer assembly, comprising:

a closer body;

a pinion rotatably mounted to the closer body, wherein the pinion is rotationally biased in a door-closing direction by a biasing torque and is operable to rotate in a door-opening direction opposite the door-closing direction; and a hold-open device comprising a first component operably engaged with the pinion such that rotation of the pinion is correlated with movement of the first component, the hold-open device comprising a second component operable to engage the first component to prevent rotation of the pinion in the door-closing direction when a door-closing torque on the pinion is less than a threshold torque, and to permit rotation of the pinion in the door-closing direction when the door-closing torque on the pinion is greater than the threshold torque; and wherein the hold-open device is separable from the closer body and includes a case releasably coupled to the closer body.

13. A door closer assembly, comprising:

a closer body;

a pinion rotatably mounted to the closer body, wherein the pinion is rotationally biased in a door-closing direction by a biasing torque and is operable to rotate in a door-opening direction opposite the door-closing direction; and a hold-open device configured to prevent rotation of the pinion in the door-closing direction when a door-closing torque on the pinion is less than a threshold torque, and to permit rotation of the pinion in the door-closing direction when the door-closing torque on the pinion is greater than the threshold torque; and wherein the hold-open device comprises:

a ratchet mechanism engaged with the pinion such that rotation of the pinion in the door-closing direction is correlated with movement of the ratchet mechanism in a first direction; and a pawl operable to engage the ratchet wheel to selectively prevent movement of the ratchet mechanism in the first direction to thereby prevent rotation of the pinion in the door-closing direction.

14. The door closer assembly of claim 13, further comprising a bias mechanism;

wherein the bias mechanism is configured to prevent disengagement of the pawl from the ratchet mechanism when the door-closing torque on the pinion is less than the threshold torque; and wherein the bias mechanism is configured to permit disengagement of the pawl from the ratchet mechanism when the door-closing torque on the pinion is greater than the threshold torque.

15. A hold-open device configured for use with a door closer comprising a body and a pinion that is rotatably mounted to the body and rotationally biased in a door-closing direction by a biasing torque, the hold-open device comprising:

a shaft configured to rotationally couple with the pinion;

a first component operably engaged with the pinion such that rotation of the pinion is correlated with movement of the first component;

a second component operable to engage the first component to selectively permit and prevent rotation of the pinion; and a selector operable to engage the second component to transition the hold-open device between an active mode and an idle mode;

wherein the hold-open device in the active mode is configured to selectively prevent rotation of the shaft in the door-closing direction to thereby prevent rotation of the pinion in the door-closing direction; and wherein the hold-open device in the idle mode is inoperable to prevent rotation of the shaft such that the pinion is operable to rotate in the door-closing direction.

16. The hold-open device of claim 15, wherein the first component comprises a ratchet mechanism engaged with the shaft such that rotation of the pinion in the door-closing direction is correlated with movement of the ratchet mechanism in a first direction; and wherein the second component comprises a pawl movable between an engaged position and a disengaged position, wherein the pawl in the engaged position is operable to prevent movement of the ratchet mechanism in the first direction to thereby prevent rotation of the pinion in the door-closing direction, and wherein the pawl in the disengaged position is inoperable to prevent movement of the ratchet mechanism in the first direction; and wherein the selector is configured to permit movement of the pawl between the engaged position and the disengaged position when the hold-open device is in the active mode; and wherein the selector is configured to prevent movement of the pawl between the engaged position and the disengaged position when the hold-open device is in the idle mode.

17. The hold-open device of claim 16, wherein the ratchet mechanism comprises a ratchet wheel; and wherein the first direction is a first rotational direction.

18. The hold-open device of claim 15, further comprising:

a case, wherein the shaft is rotatably mounted to the case; and a housing, wherein the selector is mounted to the housing; and wherein the housing is removable coupled to the case to thereby permit removal of the selector.

19. The hold-open device of claim 15, wherein the selector comprises a toggle having an active position and an idle position; and wherein the hold-open mechanism further comprises a detent mechanism operable to selectively retain the toggle in at least one of the active position or the idle position.

20. A door closer assembly comprising the hold-open device of claim 15;

wherein the door closer assembly further comprises the door closer; and wherein the shaft is rotationally coupled with the pinion.

* * * * *